United States Patent [19]
Sakamoto et al.

[11] Patent Number: 6,075,767
[45] Date of Patent: Jun. 13, 2000

[54] ASYNCHRONOUS TRANSMISSION MODE (ATM) HANDLER

[75] Inventors: Ken'ichi Sakamoto; Takahiko Kozaki, both of Tokyo; Junichirou Yanagi, Yokohama, all of Japan

[73] Assignee: Hitachi, Ltd., Tokyo, Japan

[21] Appl. No.: 08/820,834

[22] Filed: Mar. 19, 1997

[30]      Foreign Application Priority Data

Mar. 19, 1996  [JP]  Japan ................................ 8-062455

[51] Int. Cl.[7] ............................. H04J 1/16; H04L 12/28
[52] U.S. Cl. .......................................... 370/228; 370/395
[58] Field of Search .................................... 370/220, 229, 370/230, 231, 233, 216, 218, 219, 221, 395, 225, 227, 228

[56]            References Cited

U.S. PATENT DOCUMENTS 5,153,578  10/1992  Izawa et al. ............................ 370/219
5,436,886   7/1995  McGill .................................... 370/219
5,715,237   2/1998  Akiyoshi ................................. 370/228

*Primary Examiner*—Chau Nguyen
*Assistant Examiner*—Chiho Andrew Lee
*Attorney, Agent, or Firm*—Antonelli, Terry, Stout & Kraus, LLP

[57]                ABSTRACT

An ATM handler that sets a switchover indication to a control register according to a system switchover order from a controller such that a switchover indication is supplied to a selector and line interfaces according to an output signal from the register. The setting of a switchover indication synchronize a switchover of an operation to count user cells between the line interfaces of the active and standby systems with a switchover of a stream of input cells to an ATM switch by a selector. A protection period is provided to allow a time after the system switchover according to a transmission delay lag. The line interface related to a delayed phase assigns a bit for stopping counting to cells input during the protection period so that the counting operation is conducted for the cells other than those assigned with the bit for stopping counting. As a result, duplicate of counting cells is prevented and the number of user cells are accurately counted.

4 Claims, 18 Drawing Sheets

FIG. 14

| DIFFERENCE OF THE LENGTH OF TRANSMISSION PATH | RECOMMENDED VALUE FOR TIMEOUT TIMER |
|---|---|
| ~100km | 1.0ms |
| ~300km | 2.0ms |
| ~600km | 4.0ms |
| ~1200km | 8.0ms |
| ~3000km | 16.0ms |
| ~6000km | 32.0ms |
| ~12000km | 64.0ms |

ASYNCHRONOUS TRANSMISSION MODE (ATM) HANDLER

BACKGROUND OF THE INVENTION

1. Field of the Invention

The present invention relates to a packet handler, and in particular, to a fixed length ATM packet handler having a redundant architecture for switchcover to a line interface.

An ATM handler for transferring information using fixed length packets (to be called cells herebelow) includes, for example, a plurality of line interface cards 1-1 to 1-n for accommodating transmission paths (incoming and outgoing lines) 7, an ATM switch (SW) 2 for switching an input cell received from either one of the line interface cards 1 over to another one of the line interface cards according to information for routing included in a cell header of the input cell, and a control part 4 connected via a control line 6 to the line interface cards 1 and the ATM switch 2 as shown in FIG. 2.

Each line interface card 1 includes a line interface circuit 15 for each pair of incoming and outgoing lines. The circuit 15 includes a physical layer processing function for conducting a signal process, for example, an opto-electric conversion and vice versa on a physical layer to process signals communicated with the transmission paths 7 and an ATM layer processing function for accomplishing a signal process on an ATM layer, for example, a process of updating a cell header. Although FIG. 2 shows a configuration in which one line interface circuit s provided for each line interface card, it may also possible to mount a plurality of line interface circuits in one line interface card. Namely, one line interface card can accommodate a plurality of transmission paths.

The control part 4 achieves operations such as a control operation for connecting calls, a re-writing operation of a header conversion table in each line interface circuit 15, an operation to supervise the overall operation of the ATM handler including the operation of the ATM switch 2, and an operation to collect various performance information items acquired by the respective line interface circuits 15. The control part 4 is linked with a network management function 5 via a communication line for network management 8 to transmit in response to an order from the network management function 5 supervision/defect information to the network function 5 which is a higher level device of the control part 4.

In such an ATM network requiring high reliability as a public network, the main transmission path system is, for example, duplicated in a redundant configuration for an alternative route at occurrence of a failure as well as for maintenance and inspection of the system.

FIG. 3 shows as an example of the redundant configuration of ATM network a network configuration including a duplicated system of transmission paths (backbone network) 7-b connecting ATM handlers 11 (11A to 11C) to each other.

In relation to the redundant system of backbone network 7-b, each ATM handler 11 includes a duplicated system of line interface cards 1-b accommodating the backbone network 7-b (redundant transmission paths). In this construction, one of the cards 1-b is used as an active system and the remaining one thereof is adopted as a standby system in a selective fashion.

Reference numeral 7-a indicates transmission paths on the subscriber's side. In this example, one line interface card 1-a accommodates a plurality of subscriber lines, for which there are missing the standby system. This also applies to the line interface cards related thereto. However, to guarantee reliability of communication, the redundant configuration may be adopted also for the subscriber lines depending on cases.

FIG. 4 shows the construction of an ATM handler 11 accommodating the transmission paths in the redundant system.

Numeral 1 (1-1 to 1-n) indicate line interface cards each including a line interface circuit 15. In association with the duplicated transmission paths, for a set or pair of two line interface circuits associated with a working path and a protection path, a stream of cells from either one pertinent transmission path is delivered by selectors 9 (9-1 to 9-j) disposed on a selector card 3 to the ATM switch 2. In the subsequent description, of the two transmission paths including working and protection paths, the path selected by the selector 9 is called an active path or system and the remaining one thereof is called a standby path.

An input cell received from a line interface on the active system side is supplied via the selector card 3 to an input port of the ATM switch 2 to be then routed to either one of the output according to the contents of the cell header thereof. The output cell is sent via the selector card 3 to be broadcast to line interface cards of the active and standby systems corresponding to the output port. The cell is thereby transmitted to the respective transmission paths. In a case in which the transmission path is required to be switched over because of, for example, a failure detected in a transmission path on the active system side, a predetermined switchover, or a system maintenance, a system switchover order is notified to the selector 9 according to an order from the network management function 5 or a decision of the control part 4.

In the ATM handler 11, to supervise the statuses of paths and connections duplicated on the respective transmission paths, it is required to collect performance information measured by each line interface circuit 15. The performance information includes, for example, a count value of user cells, a count value of invalid cells, a count value of unassigned cells, and a count value of OAM (Operation and Maintenance) cells respectively measured for each connection measured by an ATM layer processing block of each line interface circuit. Of these performance information items, the count value of user cells (to be called the number of user cells herebelow) for each connection/path is particularly employed as basic data for an accounting operation. Therefore, it should be taken into consideration to prevent an event in which same cell is duplicatedly counted by mistake in the course of system switchover.

FIG. 5 shows a point for collecting the number of user cells in the ATM handler 11 accommodating duplicated transmission paths and non-duplicated ordinary transmission paths.

In FIG. 5, reference numerals 1-1 and 1-2 indicates line interface cards in pair respectively for working and protection paths. The system switchover or change-over is carried out by the selector 9. A numeral 1-3 denotes a line interface card linked with an ordinary transmission path not duplicated. In this diagram, for easy understanding the stream of cells, three line interface cards 1-1 to 1-3 related to an ATM connection 10 are arranged on the right and left sides and the selector card 3 is subdivided into a selector card 3-1 on the duplicated transmission path side and a selector card 3-2 on the ordinary transmission path side.

In the ATM handler 11, the number of user cells is counted for each connection by the line interface circuits on the input and output sides. When the line interface cards are duplicated, the user cells are counted on the line interface circuit for the active path.

Assuming in FIG. 5 that the line interface card 1-1 of the working path is the active system, a point for collecting performance information PM is set to an input side PM (a) 40-*a* and an output side PM (d) 40-*d* in the line interface card 1-1 and an input side PM (b) 40-*b* and an output side PM (c) 40-*c* in the line interface card 1-3. When a system switchover is conducted by the selector 9, the line interface card 1-2 of the protection path in the standby status becomes active and the points for collecting performance information PM are changed, that is, a point for collecting performance information PM is set to PM (a) 40-*a* and PM (d) 40-*d* in the line interface card 1-2.

After the system switchover, it is required that each number of user cells counted by the line interface card 1-1 which has been the active system up to this point is transferred to the point of collecting performance information of the line interface card 1-2 thus set to the active system.

FIG. 6 shows a transfer operation of the number of user cells by the line interface circuit on the input side at system switchover. In the graph of FIG. 6 indicating the lapse of time along an abscissa, flows of ATM cells 50 to be counted are schematically depicted. Reference numerals 51-0 and 51-1 respectively stand for flows of input cells 50 and 50' respectively of the working and protection paths, a reference numeral 51-2 denotes a flow of cells inputted via the selector 9 to the ATM switch 2, and an asterisk indicates cells counted by the interface on the input side.

Assume a case in which when the line interface circuit 15-1 of the working path is in the active status, the selector conducts a system switchover (arrow mark 52) in response to an order from the control part 4 such that the count operation of user cells is changed over to the line interface circuit 15-2 of the protection path at a point of time (arrow mark 55) after a lapse of delay time T. The delay time T is inevitable required when the control part 4 communicates control orders and performance information with a large number of line interface cards according to predetermined protocols.

When there is missing any difference in phase of the stream of cells between the line interface circuits of the working and protection paths and cells are normally supplied to both transmission paths (working and protection paths) in a successive manner even after the system switchover like in a case of a routine maintenance, the line interface circuit 15-1 of the working path can count input cells 50 (fourth and fifth cells) during the delay time of switch notification from when the selector conducts the switchover of the stream of cells to when the counter operation is changed over. Therefore, it is guaranteed that the line interface circuit 15-2 of the protection path count on the input side the input cells 50' (fourth and fifth cells) not counted by the line interface circuit 15-1 of the working path, thereby transferring the count operation from the working path to the protection path.

In other words, the control part 4 acquires the number of user cells up to the fifth cell from the line interface circuit 15-1 of the working path to add after the system switchover the number to the number of user cells including the sixth and subsequent user cells counted by the line interface circuit 15-2 of the protection path. As a result, it is possible to appropriately obtain the number of user cells inputted to the ATM handler 11. Additionally, the selector can receive, after the last input cell 50 (third cell) from the line interface circuit 15-1 of the working path, the succeeding cells 50' fourth cell, fifth cell, etc.) the line interface circuit 15-2 of the protection path without losing any cells. In consequence, the line interface circuit 15-3 on the output side of the ATM switch 2 can correctly count the number of output user cells.

However, in the example shown in FIG. 6, it is assumed that (1) the cells are supplied to the working and protection paths without a phase difference therebetween and (2) cells are continuously inputted to the respective redundant transmission paths also after the selector switches over the system. Consequently, the cell counting operation cannot be appropriately accomplished when these premises are changed.

For example, when a defect or failure takes place in a transmission path in the active status, since the stream of cells 51-0 is interrupted in the line interface circuit 15-1 of the working path at a point of time 52 when the selector conducts the switchover, it is impossible for the line interface circuit 15-1 of the working path to count cells 50 (fourth and fifth cells) inputted from the line interface circuit 15-2 of the protection path to the selector 9 within the switchover delay time T.

In addition, when the delay time of cell transmission varies between the duplicated transmission paths, a phase difference appears for the input cell between the working and protection paths in the line interface circuit on the input side of the ATM handler. For example, as can be seen from FIG. 7, assume that the redundant transmission paths 7 establish connections between an ATM handler 11-1 at Osaka and an ATM handler 11-2 at Tokyo, a transmission path 13-*a* to be used as 6, protection path is provided via systems for data transmission 12 and 12' installed respectively in kanazawa and Maebashi, and another transmission path 13-0 to be adopted as a working path is disposed along Tokaido. In this case, due to the difference between the respective transmission paths and that between devices at nodes, there appears between the transmission paths a delay difference which cannot be ignored.

Assume that the difference in transmission delay is represented as Td and a phase difference of at least one cell (two cells in this case) takes place in the stream of input cells, for example, in the line interface circuits 15-1 and 15-2 respectively of the working and protection paths as shown in FIG. 8. When the selector 9 is changed over at time 52 in a manner similar to that used in FIG. 6, cells 50 (fourth and fifth cells) which are counted by the line interface circuit 15-1 of the working path and which are already inputted to the ATM switch 2 arrive at the line interface circuit 15-2 of the protection path with a delay. This results in a difficulty that these cells 50 are duplicated supplied to the ATM switch 2. Consequently, the number of cells counted on the output side of the ATM switch 2 is larger than the actual number of cells and hence an error occurs in the accounting process.

In addition, even when the system is switched over in a status free of the defect on the transmission path, the continuity with respect to numbers assigned to cells cannot be guaranteed between the last cell 50 (seventh cell) counted on the input side by the circuit 15-1 of the working path and the first cell 50' (sixth cell) counted by the circuit 15-2 of the protection path. Therefore, even when the control part 4 adds to each other the count values respectively of the circuits 15-1 and 15-2 of the working and protection paths, it is impossible to obtain the correct number of user cells.

SUMMARY OF THE INVENTION

It is therefore an object of the present invention that in an ATM handler in which the line interface circuits are constructed in a multiplex configuration (to be referred to as a redundant scheme) for an alternative route at occurrence of a defect in a transmission path or for system maintenance and inspection, it is guaranteed that user cells are correctly counted at system switchover to thereby obtain reliable information of performance.

Another object of the present invention is to provide an ATM handler in which the counting operation of user cells is controlled by use of a particular cell identifier employed in the handler, thereby preventing an event of duplicatedly counting user cells by mistake and achieving an accounting service for a particular connection.

To achieve the objects above the present invention provides an ATM handler including a selector for system switchover between an ATM switch and a pair of line interface circuits in the redundant architecture. The selector is operated in response to a system switchover order from a controller to thereby change over the line interface circuit to be connected to the ATM switch. The ATM handler also includes a register of which a status value is altered according to the system switchover order. The system switchover by the selector and the switchover of a counting operation of user cells in the paired line interface circuits are carried out in response to a system switchover signal output from the register.

A favorable embodiment according to the present invention includes a selector card including a plurality of selectors and a line interface card of a working path and a line interface card of a protection card in which each of the cards includes at least one line interface circuit. Each of the line interface and selector cards includes a communication interface to communicate with a higher level controller (e.g., a processor for signalling) thereof and a microprocessor connected to the communication interface. The microprocessor of each line interface card periodically collects status information including the value of cell count from each line interface circuit in the card and receives a control order from the controller via the communication interface. In response thereto, the microprocessor delivers control information (e.g., header conversion information) to each line interface circuit in the card and sends the status information to the controller. On the other hand, the selector card includes a register for outputting a plurality of system switchover signal corresponding to the respective selectors. The microprocessor changes the status value of the register means according to the system switchover order received from the controller via the communication interface.

The system switchover signal output from the register is input to the pertinent selector. In concurrence therewith, the signal is supplied via a wire, for example, individually disposed for each pair of line interface cards to the pertinent line interface circuit in the line interface cards for working and protection paths.

The system switchover signal may be supplied to the respective line interface cards, for example, as follows. On each of the line interface cards for working and protection paths, a bus interface is mounted to distribute the system switchover signal to a plurality of line interface circuits. Moreover, a bus interface is disposed in the selector card such that the bus interfaces are coupled with each other via an internal bus. When the microprocessor on the side of selector card sets system switchover data to the register in response to the system switchover order received from the controller, the system switchover data is transmitted via the internal bus to the respective line interface cards.

According to another aspect of the ATM handler of the present invention, there is disposed a system switchover delay circuit for changing over the counting operation when a predetermined period of time (protection time) lapses after the system switchover is indicated by a system switchover signal on the side of the line interface circuit in which the stream of cells has a delayed phase due to the delay in transmission path. Due to the system switchover delay circuit, the counting operation can be changed over between the working path and the protection path at a synchronizing point of the stream of input cells and hence there is attained integrity between the count value of the line interface circuit of the active system before the system switchover and that of the line interface circuit to be used as the active system after the system switchover.

According to still another aspect of the ATM handler of the present invention, during the protection time provided by the system switchover delay circuit above, an indication bit for stopping counting is added to a cell supplied to the selector via the line interface circuit to be used as the active system after the system switchover such that the line interface circuit on the output side does not count the user cell having the indication bit. This leads to avoidance of duplicated counting of the cell. Incidentally, for the indication bit for stopping counting, the object of addition thereof is not limited to the protection time. Namely, the indication bit may be broadly used for user cells of a particular connection such as a connection to the police, which makes it possible to implement a special accounting service.

BRIEF DESCRIPTION OF THE DRAWINGS

The foregoing and other objects, advantages, manner of operation, and novel features of the present invention will be understood from the following detailed description when read in connection with the accompanying drawings, wherein:

FIG. 14 is a diagram showing a relationship between recommended values for timeout timer and the difference in length between transmission paths for absorbing the difference in transmission delay;

DESCRIPTION OF THE PREFERRED EMBODIMENTS

Figure 1:
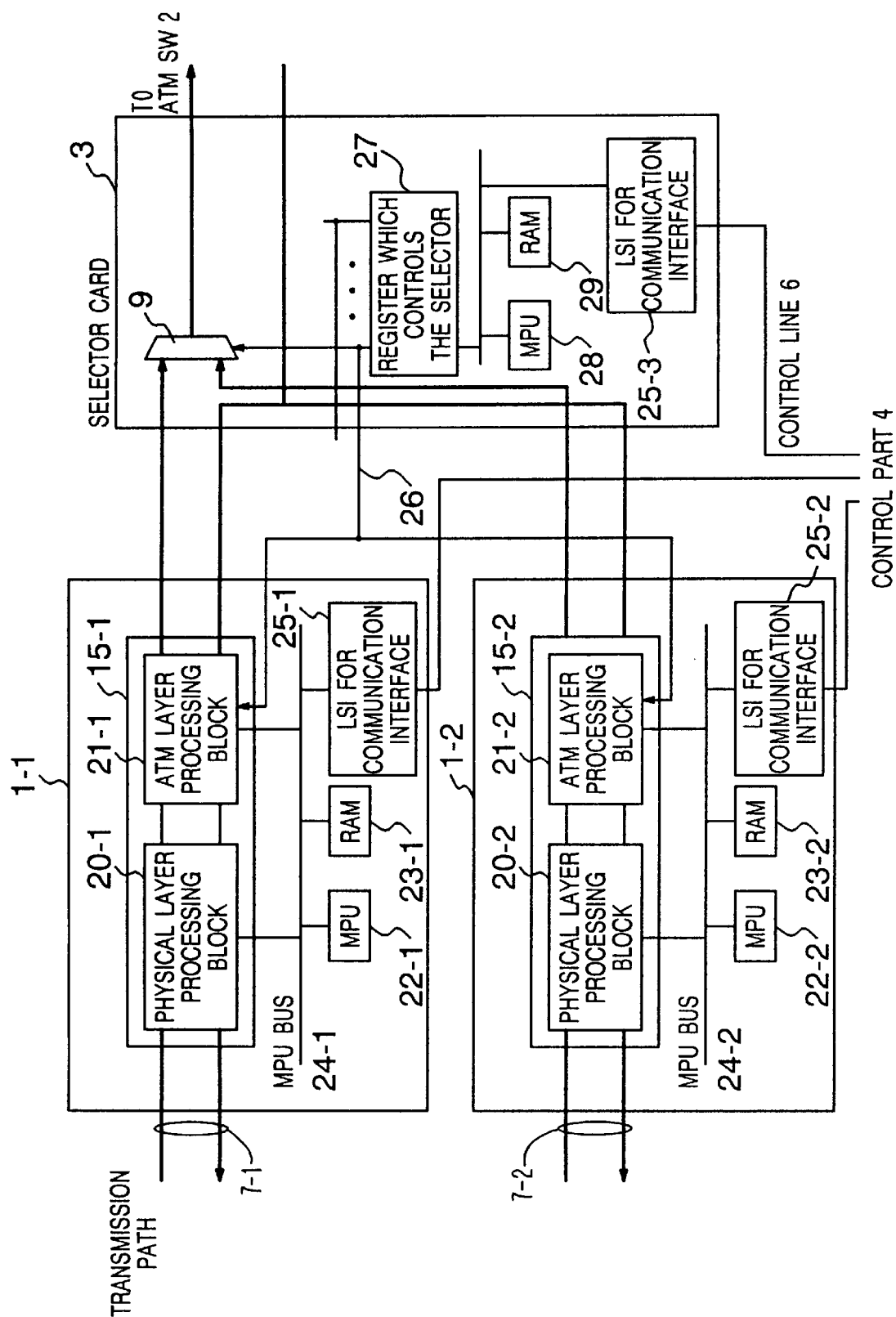
FIG. 1 is a diagram showing an embodiment of a line interface card 1 and a selector card 3 as primary sections of the ATM handler according to the present invention, the line interface card 1 including a line interface circuit and the selector card 3 including a selector for the system switchover.
Figure 2:
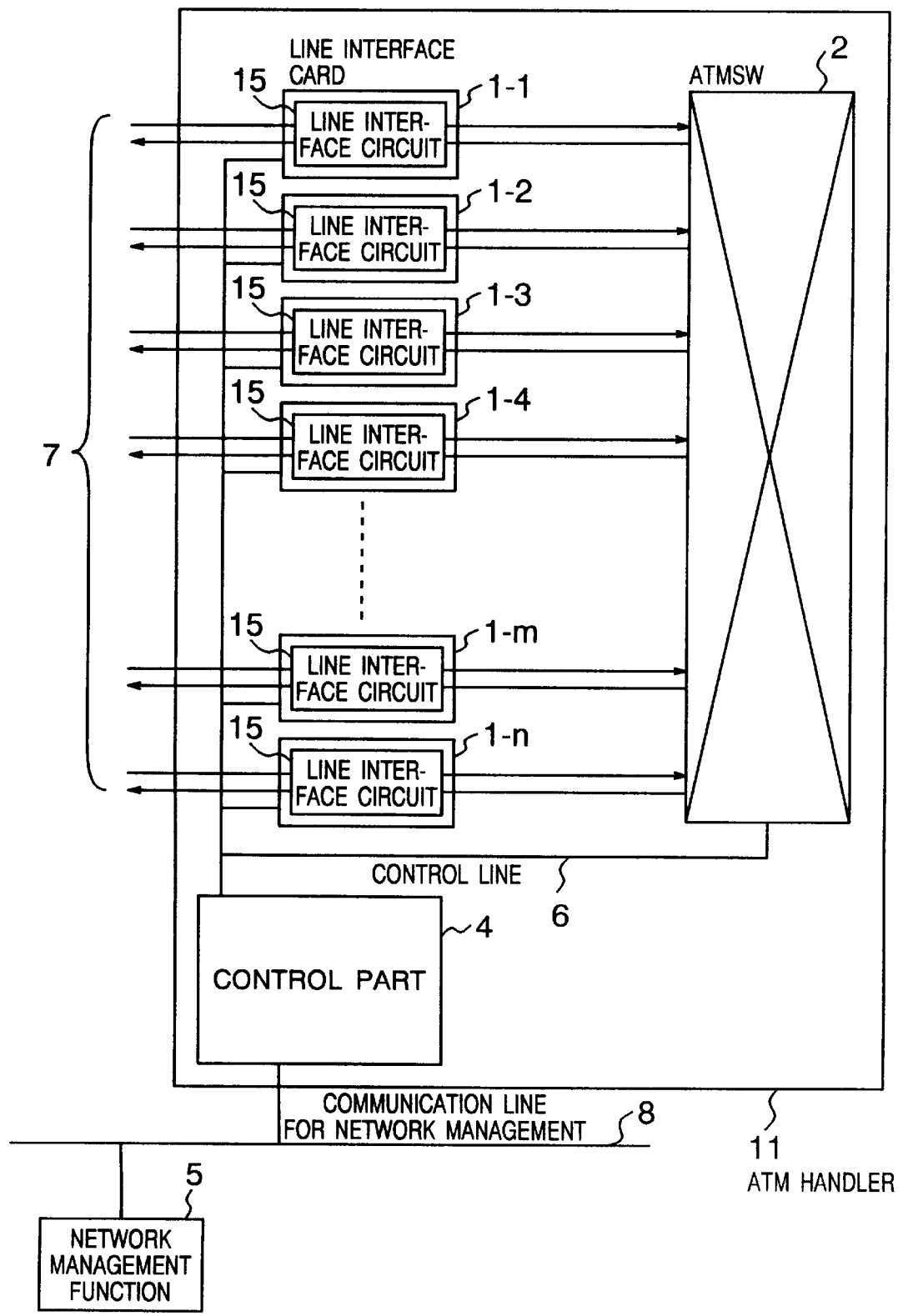
FIG. 2 is a diagram showing an example of the basic configuration of the ATM handler.
Figure 3:
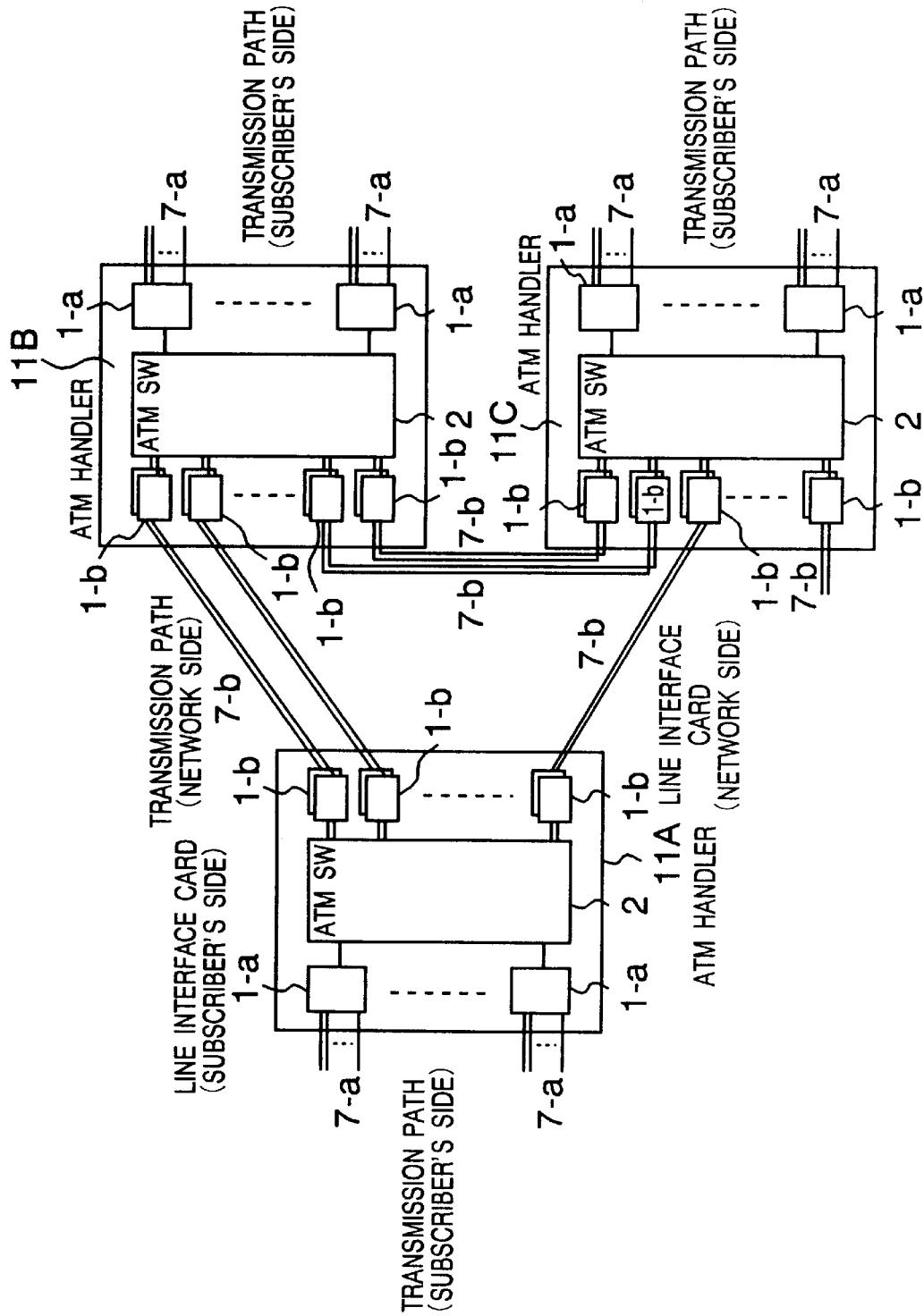
FIG. 3 is a diagram showing an example of the ATM network layout including transmission paths of a redundant architecture.

Referring now to the drawings, description will be given of an embodiment according to the present invention.

FIG. 1 shows an embodiment of the primary blocks of the ATM handler according to the present invention.

Reference numerals 1-1 and 1-2 respectively indicate line interface cards in pair respectively including line interface circuits 15 respectively accommodating transmission paths 7-1 and 7-2 for working and protection paths in a redundant architecture and a numeral 3 denotes a selector card for selecting an output from either one of the line interface circuits and supplying the output to an input port of an ATM switch. The entire structure of the ATM handler includes, like the configuration shown in FIG. 4, a plurality of pairs of line interface cards 1-1 to 1-n, a selector card 3 including a plurality of selectors 9-1 to 9-j, an ATM switch 2, and a control part 4.

Each line interface card 1 includes, in addition to the line interface circuits 15 working and protection paths, a microprocessor (MPU) 22, a random access memory (RAM) 23 used by the MPU 22 for processing data, and a communication interface large scale integration (LSI) unit 125. These constituent elements are mutually connected to each other via an internal bus 24. In this regard, a software (firmware) block stipulating the control operation of the MPU 22 is treated as a portion of the MPU 22 and hence is not shown in the diagram.

The line interface circuit 15 includes a physical layer processing unit 20 for primarily achieving a header processing, supervision of performance, supervision of defect, and the like of the physical layer and an ATM layer processing unit 21 for conducting an ATM header conversion, a usage parameter control processing (UPC), assignment of an internal routing tag, supervision of performance, supervision of defect, and the like. Additionally, the MPU 22 controls the line interface circuit 15 according to control information received from the control part 4 via the communication interface LSI unit 25 and a control line 6 and report information of defect and performance detected and/or collected by the interface circuit 15 to the control part 4.

The selector card 3 includes a selector for selecting either one of the streams of input cells received via the paired line interface circuits 15 and supplying the stream of input cells to an input port of the ATM switch 2, a selector control register 27 for outputting a selection signal of the selector 9, an MPU 28 for setting a status value for the system specification to the selector control register 27, a RAM 29 and a communication interface LSI unit 25-3 to be used by the MPU 28.

Figure 4:
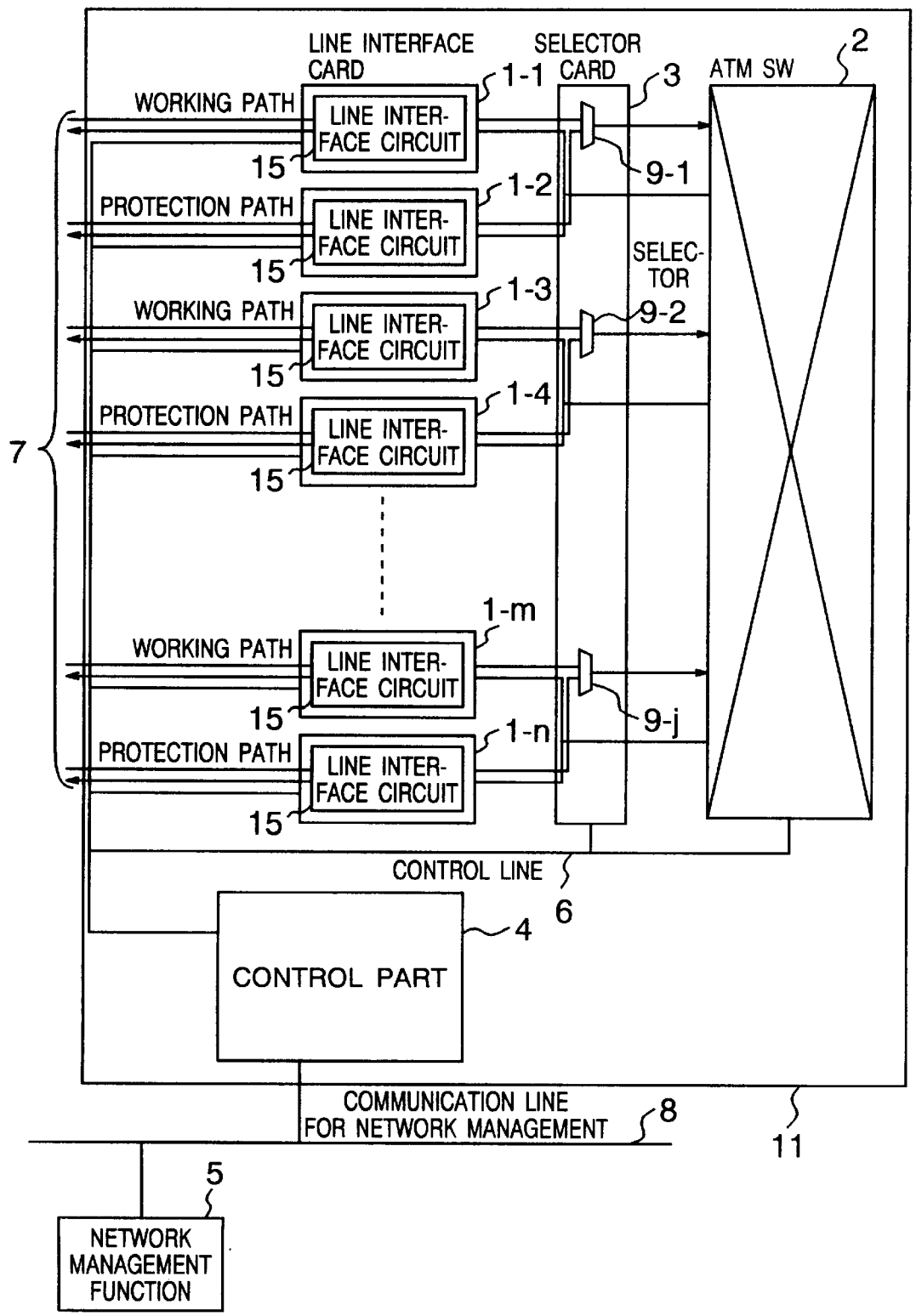
FIG. 4 is a diagram showing an example of the configuration of the ATM handler accommodating transmission paths in a redundant architecture.
Figure 5:
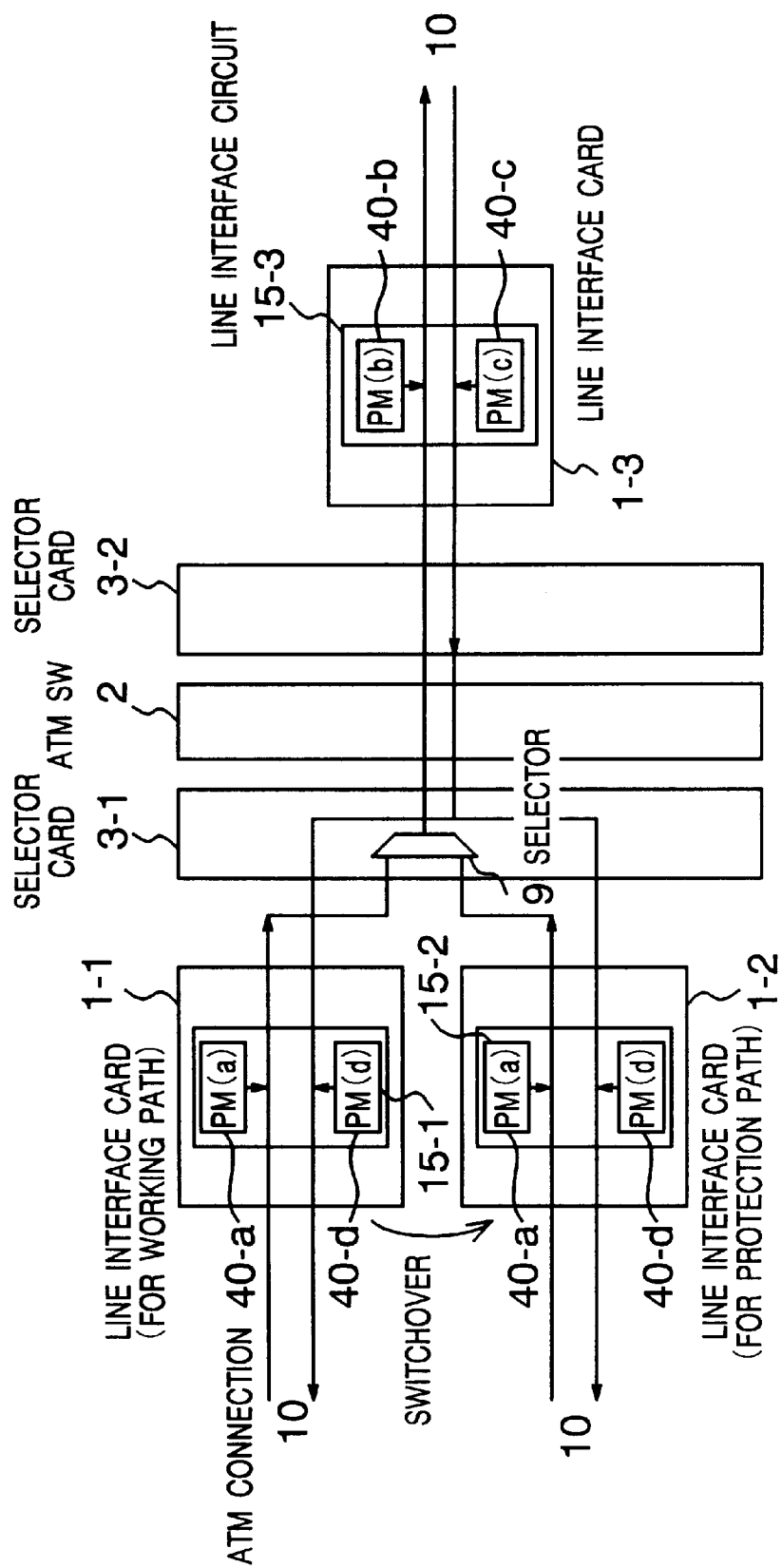
FIG. 5 is a diagram for explaining a point for collecting performance information in connections of the ATM handler.

Although the selector card 3 includes only one selector 9 in the diagram, there are actually installed in an actual ATM handler a plurality of selectors corresponding to the plural pairs of line interface circuits shown in FIG. 4 such that the selectors 9 are selectively controlled by the MPU 28. In this case, it is only necessary that each selector corresponds to each associated bit of the register 27 and it is only necessary to generate a plurality of system switchover signals for the respective bits from the register including a plurality of bits.

The MPU 28 is connected to the control part 4 via the communication interface LSI unit 25-3 and the control line 6. When the control part 4 issues a system switchover order to the selector card, the order is transmitted to the MPU via the control line 6 and the communication interface LSI unit 25-3. The MPU 28 changes over in response o the system switchover order the status value of the selector register 27 corresponding to the particular transmission path.

As can be appreciated from the configuration above, between the control part 4 and the respective Line interface cards 1, the control order, performance information including the count value, header conversion information, and the like are communicated according to a predetermined communication protocol decided by the communication interface LSI unit 25 mounted on each respective card 1. Therefore, in a control system in which the control part 4 issues a system switchover order of a particular path via the control line 6 to the selector card 3 and an order of count operation change-over independently to a pair of line interface cards 1-1 and 1-2 corresponding to the switchover path, there appears a difference in time between the values of arrival time of the order to the respective cards, the difference being decided by the communication protocol. Resultantly, between the system switchover time by the selector and the change-over time of count operation by the pertinent line interface circuit, there occurs a delay in time which cannot be disregarded.

To solve the problem above according to the present invention, the control part 4 issues the system switchover order only to the selector card 3. In response to the order, the status value of the selector control register 27 on the selector card 3 is altered such that the selector 9 switches over the system in response to a system switchover signal outputted from the register 27. According to an aspect of the embodiment, between the line interface cards 1 and the selector card 3, the signal line 26 is individually installed for each pair of line interface circuits 15 such that the system switchover signal is supplied via the individual signal line 26 to each line interface circuit 15 to thereby synchronizing the system switchover by the selector 9 with the change-over of counting operation of user cells by each line interface circuit 15.

Figure 9:
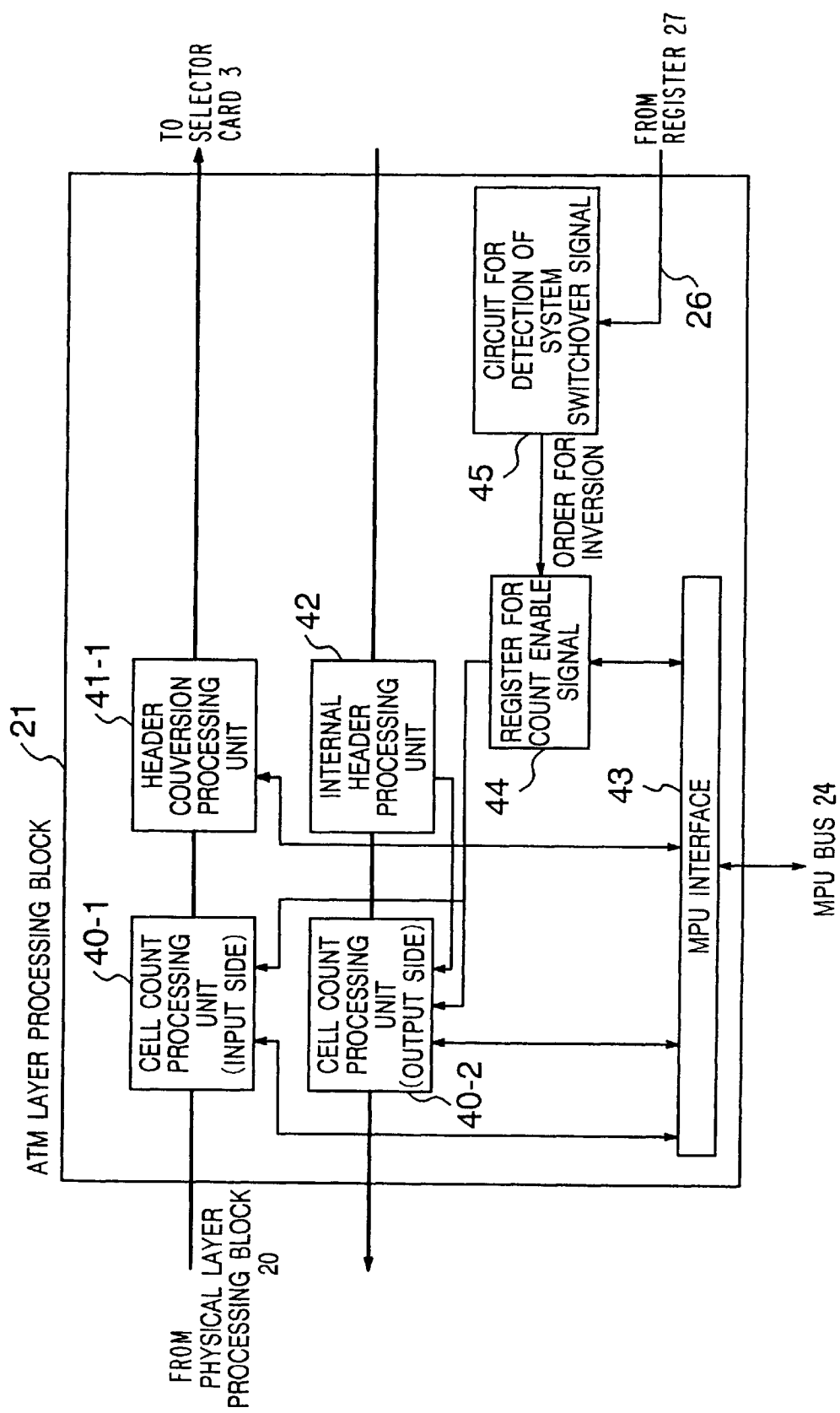
FIG. 9 is a block diagram showing a first embodiment of an ATM layer processing unit 21 of the ATM handler according to the present invention.

FIG. 9 shows a detailed configuration of the ATM layer processing block 21 (21-1, 21-2) of FIG. 1.

User and control cells received from the physical layer processing block 20 are discriminated by the cell count processing unit 40-1 so as to count the number of user cells, the number of OAM cells, the number of unassigned cells for each connection. In the header conversion processing unit 41 in the subsequent stage, the input cell received from the unit 40-1 is subjected to an ATM header conversion and is then assigned with an internal cell header including a routing tag necessary for the ATM switch 2. The cell is thereafter sent to the selector card 3.

On the other hand, the output cell of the ATM switch 2 supplied from the side of selector card 3 is fed to the internal cell header processing unit 42 such that the internal header thereof is removed and the obtained cell is delivered to the cell count processing unit 40-2 on the output side so as to count the number of user cells, the number of OAM cells, the number of unassigned cells for each connection. After the counting operation is finished, the cell is transferred to the physical layer processing block 20.

The cell count processing units 40-1 and 40-2 and the header conversion processing unit 41 are connected via the MPU interface 43 to the MPU 22 mounted on each fine interface card 1 to accomplish operations such as the collection of each count value to the MPU 22 and the rewriting of header information in the header conversion table by the MPU 22.

When the transmission paths are configured in the redundant architecture, the operation to count user cells is conducted by the ATM layer processing unit 21 of the line interface circuit in the active status. In this embodiment, each ATM layer processing block 21 includes a register 44 to which one-bit count enable information is set. According to the status ("0" or "1") of an output signal from the register 44, an indication of whether or not the counting operation is to be achieved is issued to the cell count processing units 40-1 and 40-2.

When the setting value of the selector control register 27 on the selector card 3 is changed by the order from the control part 4, the signal status of the wire 26 is reversed. The change in the status of the wire 26 is sensed by a system switchover sensor circuit 45 disposed in each ATM layer processing block 21. The sensor circuit 45 then outputs an indication for inversion to the count enable setting register 44. As a result, the cell counting operation is stopped in the ATM layer processing block which has been the active system up to this point and then the cell counting operation is initiated in the ATM layer processing block of the line interface circuit set as the active system.

Figure 6:
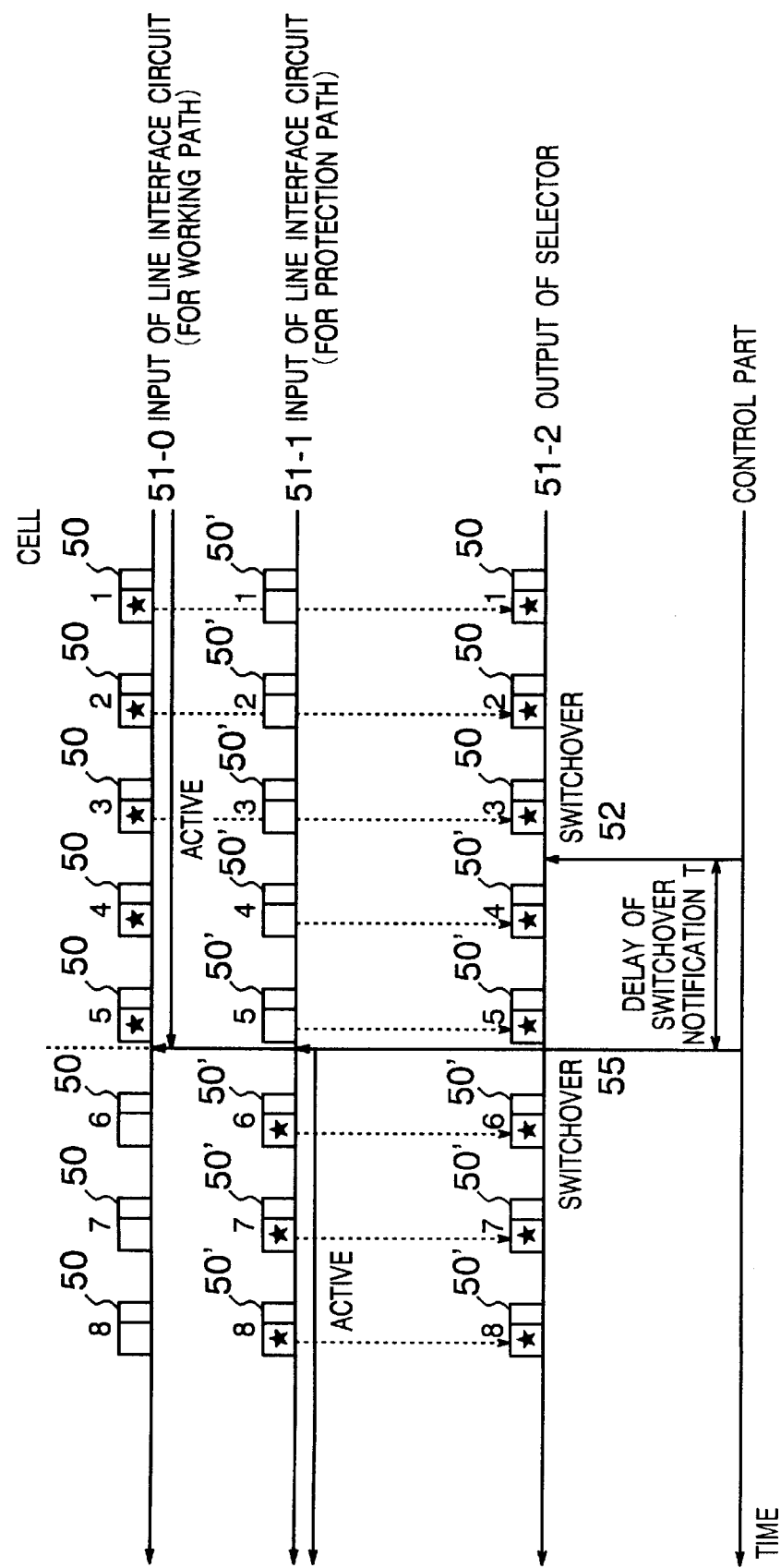
FIG. 6 is a diagram for explaining a relationship between the operation to count user cells and the system switchover in the ATM handler.
Figure 7:
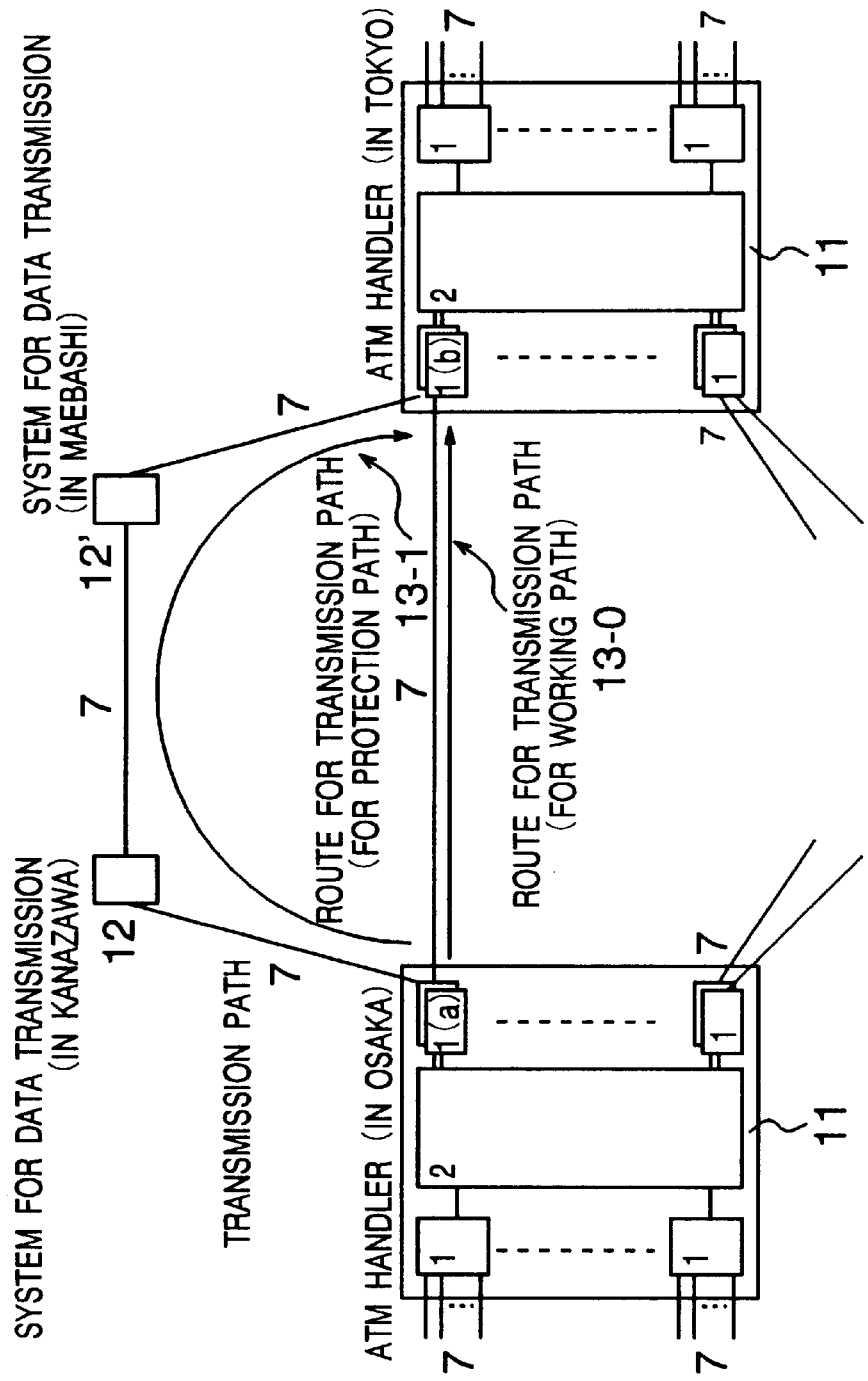
FIG. 7 is a diagram showing an example of the ATM network having the difference in transmission delay.
Figure 8:
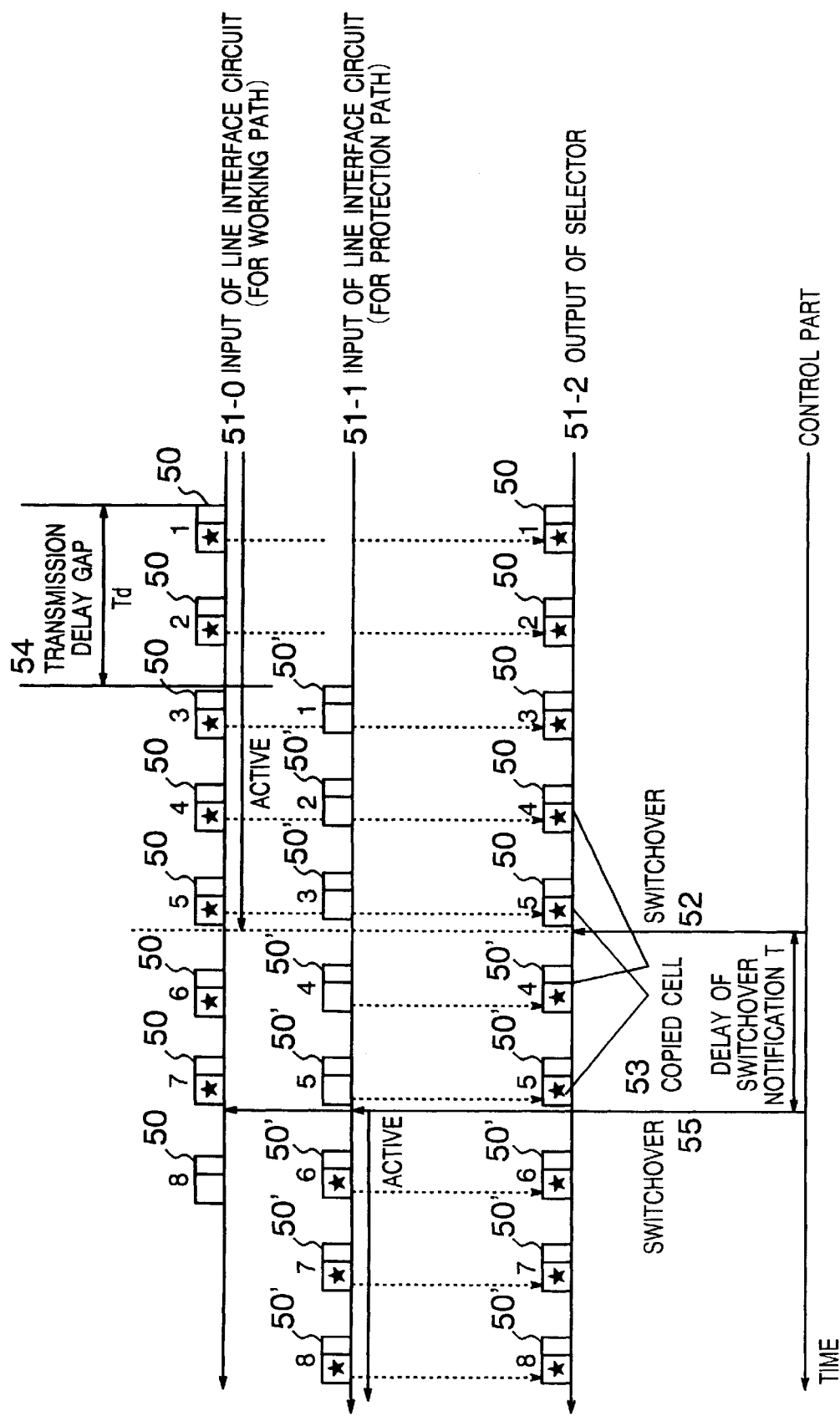
FIG. 8 is a diagram for explaining a relationship between the operation to count user cells and the system switchover when the difference in transmission delay exists in the ATM handler.
Figure 10:
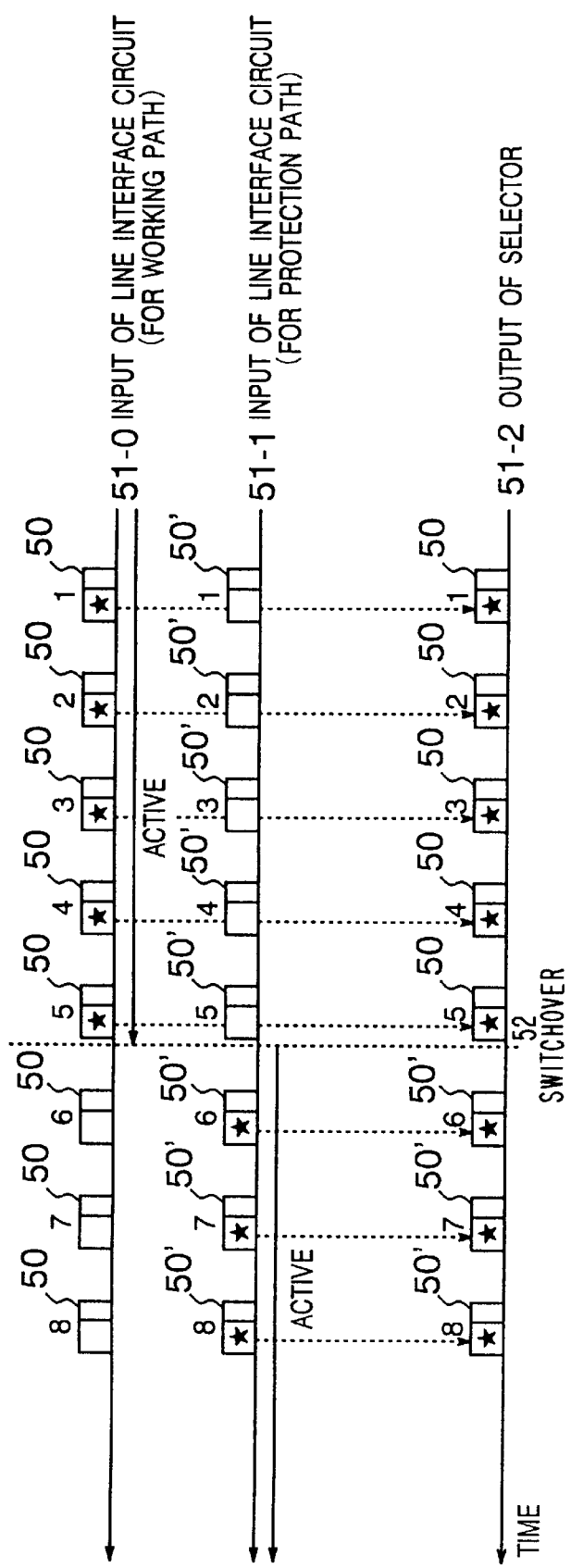
FIG. 10 is a diagram for explaining a relationship between the operation to count user cells and the system switchover on the input side of the ATM handler according to the present invention.

FIG. 10 schematically shows a relationship between streams of cells 51-0 and 51-1 respectively inputted to the line interface circuits 15-1 and 15-2 respectively of the working and protection paths, operation to count cells (indicated by an asterisk), and a stream of cells 51-2 from the selector 9. It is assumed, like in FIG. 6, that the abscissa represents the lapse of time and the phase difference is missing between the streams of input cells respectively of the working and protection paths.

In a case where the selector switches over the system at a point of time (52) when the line interface circuit 15-1 of the working path in the active status counts the fifth input cell 50, the line interface circuit 15-2 of the protection path interrupts the cell counting operation substantially at the same time. Thereafter, the line interface circuit 15-2 of the protection path thus set as the active system commences the cell counting operation.

Resultantly, as can be understood from cell numbers of cells indicated by an asterisk, the line interface circuit 15-2 of the protection path can starts the counting operation beginning at a cell, i.e., cell 50' (sixth cell) next to the last cell 50 (fifth cell) counted by the line interface circuit 15-1 of the working path. Moreover, since the stream of cells outputted from the selector 9 matches the cells counted on the input side, the line interface circuit on the output side can correctly count the cells.

Figure 11:
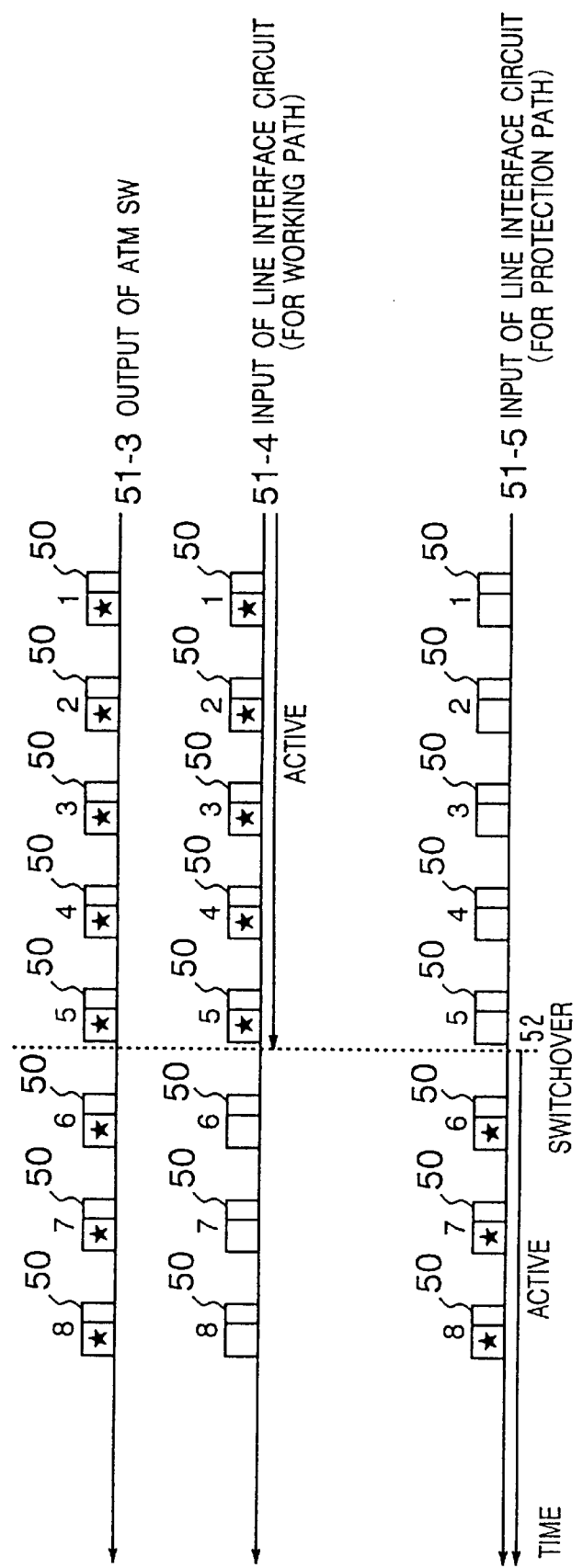
FIG. 11 is a diagram for explaining a relationship between the operation to count user cells and the system switchover on the output side of the ATM handler according to the present invention.

FIG. 11 schematically shows a relationship between a stream of cells 51-3 at an output port of the ATM switch 2 and streams of output cells 51-4 and 51-5 of the line interface circuits 15-1 and 15-2 respectively of the working and protection paths.

The stream of cells 51-3 is supplied directly from the ATM switch 2 to the line interface circuits 15-1 and 15-2 for working and protection paths. The cells of the stream 51-3 up to the fifth cell are counted by the interface circuit 15-1 for working path in the active status. When the system is switched over at time 52, the sixth and subsequent cells are counted by the interface circuit 15-2 for protection path thus set to the active status. This enables the cells to be correctly counted also on the output side.

Figure 12:
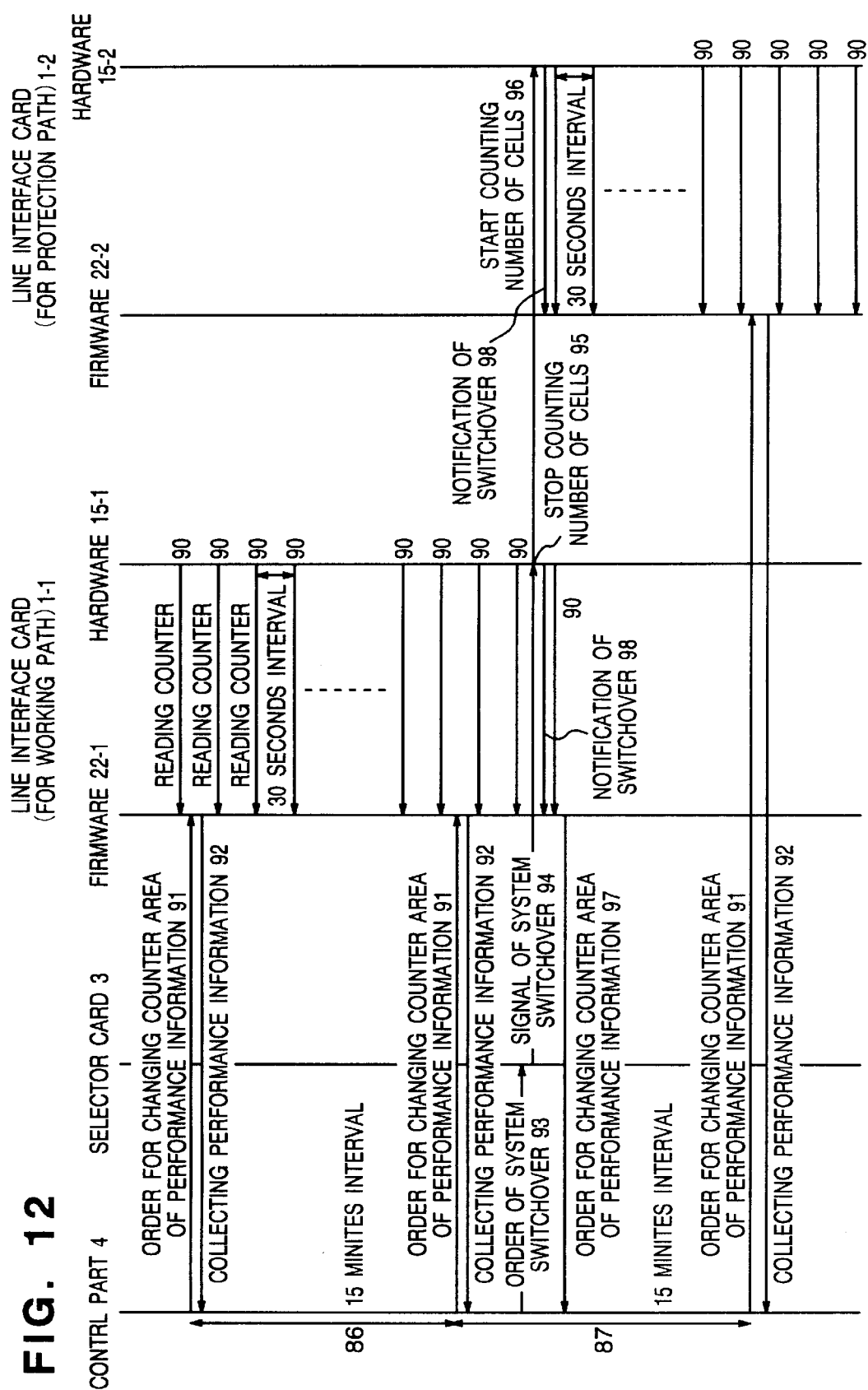
FIG. 12 is a diagram showing a control sequence for the system switch over and collection of performance information in the ATM handler according to the present invention.

FIG. 12 shows an example of the control sequence of the collection of information and system switchover accomplished between the control part 4, the selector card 3, and the line interface cards 1-1 and 1-2 respectively for working and protection paths.

The MPU (firmware) 22 of each line interface card 1 includes two counter areas for the addition of information of performance such that the counter areas are changed over to each other according to a switchover indication of memory area for performance information issued from the control part 4.

As indicated by a reference numeral 86, the control part 4 issues a switchover indication 91 of memory area for performance information at a fixed interval of time (15 minutes in this example) to the line interface card 1 in the active status (line interface card 1-1 for working path in this example).

When the interface card 1-1 for working path receives the switchover indication 91, the MPU 22-1 switches over the counter area and then reports the count value accumulated in the old counter area to the control part 4 (collecting of performance information 92). The MPU 22-1 of the working path reads the count value from the ATM layer processing block 15-1 (90) at a fixed interval of time (30 seconds in this example) to achieve an addition of the number of cells in the new counter area. In this connection, the count value of the counter in the ATM layer processing block 15-1 is reset each time the MPU 22-1 reads the count value therefrom.

A numeral 87 indicates a control sequence when the system switchover is conducted during the cycle of collecting information of performance due to, for example, the predetermined system switchover or maintenance.

When the control part 4 issues a system switchover order 93 to the selector card 3, the setting value of the selector control register 27 is changed over and hence the signal status of the wire 26 is varied. The status change of the wire 26 is notified as a system switchover signal 94 to switch over the selector 9. Simultaneously, the hardware system for working path (ATM layer processing block 15-1 of the line interface circuit 1-1) stops the cell counting operation (95) and then the hardware system for protection path to be set as the active system (ATM layer processing block 15-2 of the line interface circuit 1-2) commences counting cells (96).

The switchover of counting operation in each ATM layer processing block 15 is reported to the MPU (firmware) 22 via the count enable setting register 44 and the MPU interface 43 (98).

After the counting operation is terminated in the interface card 1-1 for working path thus set to the standby status through the switchover, the MPU 22-1 reads only once the counter value (90) to be notified to the control part 4 (97). On the other hand, in the interface card 1-2 for protection path thus set to the active status, the MPU 22-2 initiates the periodic operation of reading the counter (90). On receiving the switchover order 91 of memory area for performance information from the control part 4, the count area is changed over and then count information is reported to the control part 4 (92). The control part 4 adds the counter information collected from the new active system to that received from the old active system to obtain performance information for a period of time 87. As a result of the control sequence above, the operation to count user cells can be switched over while preventing an event of a missing cell or an event of occurrence of a duplicated counting of cells.

Figure 13:
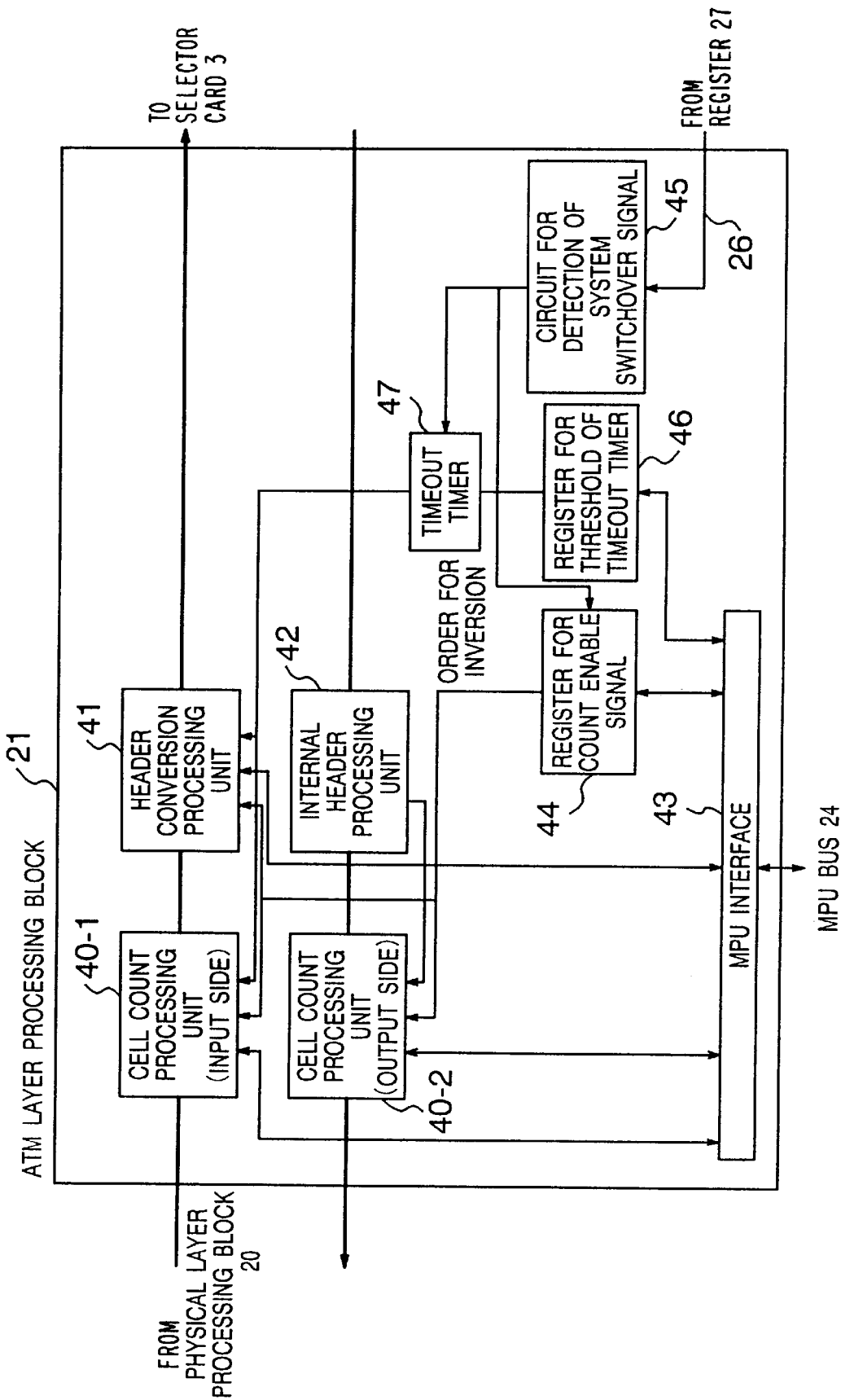
FIG. 13 is a block diagram showing a second embodiment of the ATM layer processing unit of the ATM handler according to the present invention.

FIG. 13 shows an embodiment of the ATM layer processing block 21 effective when there appears a difference or gap in transmission delay between two transmission paths (working and protection paths).

The line interface card 1 to which the ATM layer processing block 21 is applied may be almost the sane as that shown in FIG. 1. The circuit for detection of system switchover signal 45 detects a status change of the system switchover signal outputted from the selector control register 27 of the selector card 3 to the wire 26 shown in FIG. 1.

When the control part 4 instructs the system switchover and the signal status is changed on the wire 26, the circuit for detection of system switchover signal 45 detects the system switchover, reverses the setting value of the count enable setting register 44, and initiates a timeout timer 47 at the same time. In this situation, the timeout timer 47 is beforehand loaded with a period of protection time Tg set to the timeout timer setting register in advance by the MPU 22. Therefore, when the protection time Tg lapses, a timeout signal is outputted from the timeout timer 47.

The protection time Tg is provided to absorb the difference in transmission delay. For example, recommended values 71 which vary depending on differences in distance 70 between two transmission paths for working and protection paths are beforehand prepared as shown in FIG. 14. The recommended values 71 are obtained through calculation on assumption that the delay time on an optical transmission path is about 5 nanoseconds (ns)/m. In the line interface circuit which has a longer transmission path and the phase of cell stream is associated with a delayed phase, the recommended values for timeout timer are set to the time out timer setting register 46 according to the differences in distance. In the line interface circuit on the side of an advanced phase of cell stream, the value related to Tg=0 is set to the timeout timer setting register 46.

In this embodiment, when the status of the output signal from the count enable setting register 44 of the line interface circuit in the active status is altered, the cell count processing units 40-1 and 40-2 stops the counting operation and then the header conversion processing unit 41 starts an operation to add a bit for stopping counting to the input user cell. The bit for stopping counting is added to the internal header field. When the protection time Tg lapses and the timeover indication is outputted from the timeout timer 47, the operation of addition of the count stopping bit is terminated.

On the other hand, when the status of the output signal from the count enable setting register 44 of the line interface circuit in the standby status is varied, the header conversion processing unit 41 starts an operation to add the bit for stopping counting to the input user cell. When the timeover indication is outputted from the timeout timer 47, the cell count processing units 40-1 and 40-2 commences the operation to count cells. The operation associated with the count stopping bit continues until the timeover indication is outputted from the timeout timer 47. The cell count processing unit 40-2 on the output side achieves the cell counting operation for the user cells other than those assigned with the bit for stopping counting.

Figure 15:
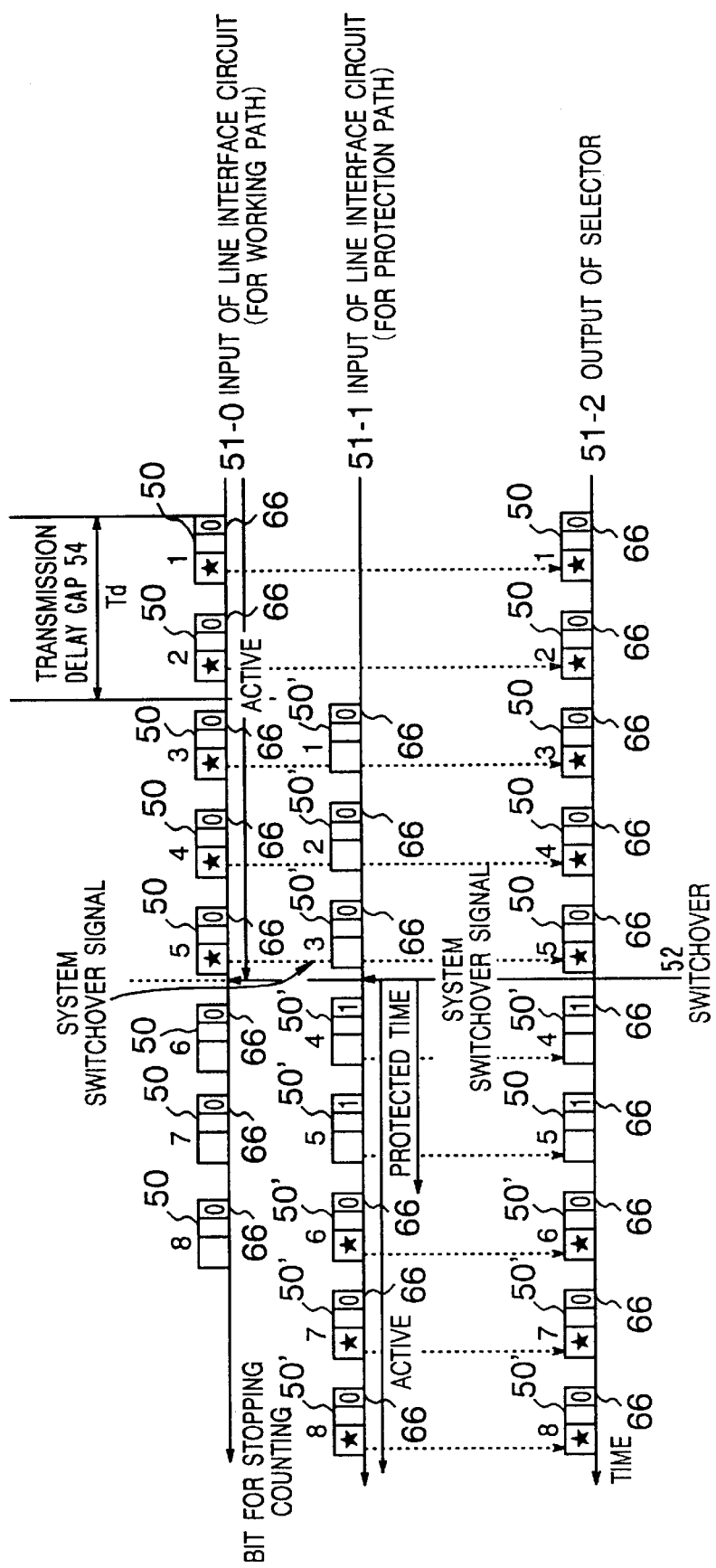
FIG. 15 is a diagram for explaining a relationship between the operation to count cells and the system switchover on the input side of the ATM handler including the second embodiment of the ATM layer processing unit according to the present invention.

FIG. 15 shows a relationship between the switchover of the operation of counting user cells and outputs from the selector in the ATM layer processing block 21 of FIG. 13.

Cells indicated by an asterisk are those already counted, and TAG 66 assigned at the top of cell denotes the contents of the bit for stopping counting. In this example, the stream of cells 51-0 of the line interface circuit 15-1 for working path 0 has an advanced phase when compared with that of cells 51-0 of the line interface circuit 15-2 for protection path. Protection time Tg is set to zero in the line interface circuit 15-1 for working path 0. In the line interface circuit 15-2 for protection path 0 on the side of delayed phase, a value suitably related to the phase difference between these streams of cells is set as protection time Tg.

First, the interface circuit 15-1 for working phase in the active status counts user cells received and hence the counted cells form the stream of output cells 512 of the selector 9. When a system switchover is instructed at time 52, the selector 9 is switched over. therefore, the operation associated with the stream of output cells of the selector 9 is changed over from the cells of working path to those of protection path. Simultaneously, the switchover order is reported to the interface circuits 15-1 and 15-2 for working and protection paths. In each line interface circuit 15, the timeout timer 47 starts operation thereof to measure protection time Tg. When the time Tg lapses, the timeout timer 47 generates a timeover indication.

In the interface circuit 15-1 for working path for which protection time Tg is set to zero, the operation of counting cells is immediately stopped. On the other hand, in the interface circuit 15-2 for protection path thus set to the active status, the operation to add the bit for stopping counting to input cells is initiated as indicated by cells 4 and 5. When the time Tg lapses, the operation to count cells is commenced and the operation to add the bit for stopping counting is terminated.

The cells 51-2 fed from the selector 9 are respectively distributed to output ports by the ATM switch 2 according to routing information contained in the respective header fields thereof and are counted by the cell count processing unit 402 on the output side of the line interface circuits 15-i related thereto.

In line interface circuits 15-i, the count enable setting register 44 indicates a count enable state such that the cell counting operation is carried out for the input user cells other than those assigned with the bit for stopping counting. Therefore, two cells 50' (fourth and fifth cells) which have passed the selector 9 during protection time Tg and which are assigned with the bit for stopping counting in the stream of output cells of the selector 9 shown in FIG. 15 are not counted in the line interface circuit 15-i on the output side.

Figure 16:
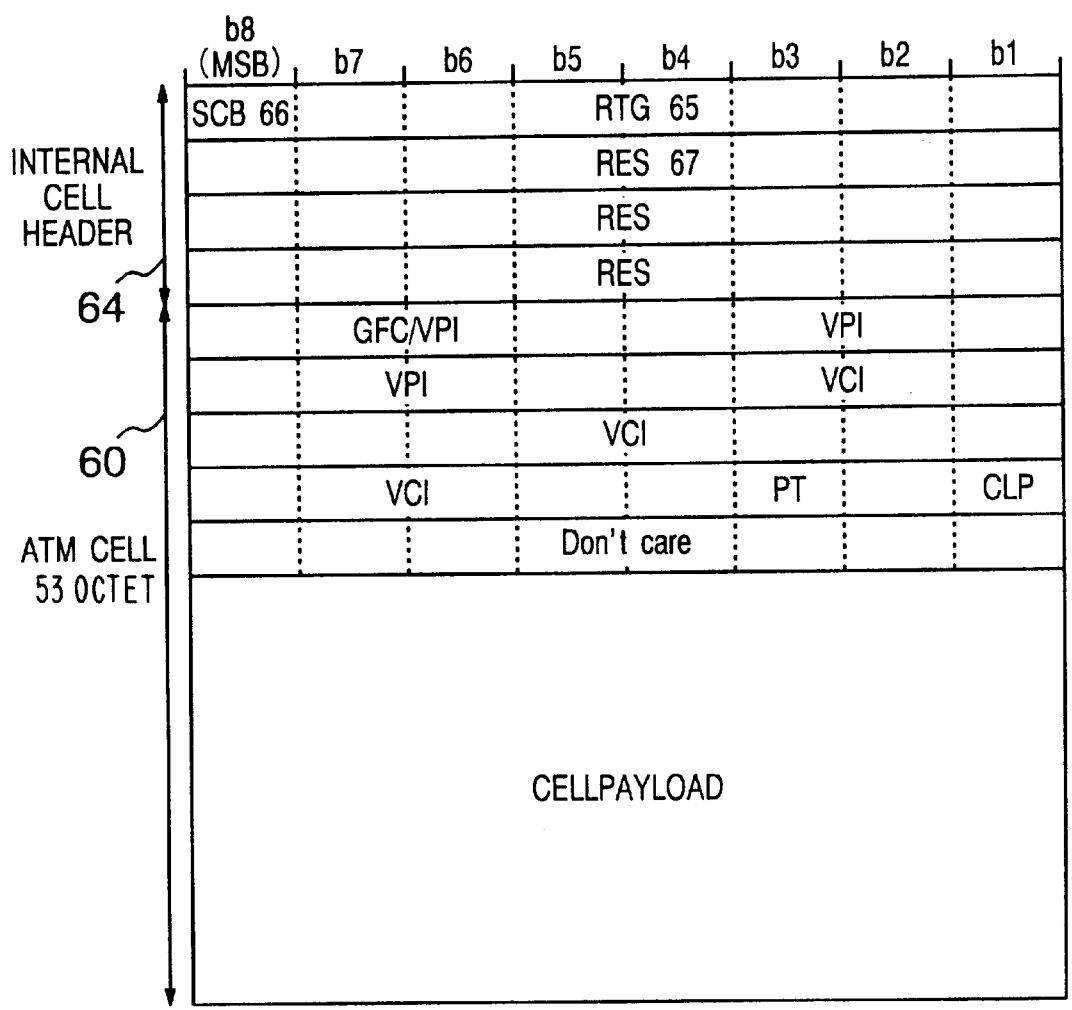
FIG. 16 is a diagram showing an example of the format of internal cells employed in the ATM layer according to the present invention.

FIG. 16 shows an example of the format of cells in the ATM handler in which the bit for stopping counting can be added to the cell.

In the ATM handler 11, an internal header 64 having a length of, for example, four bytes is added to the top of each input cell having a length of 53 bytes on the transmission path 7. Information such as the routing tag (RTG) 67 indicating a port to output cells is set to the internal cell header 64. For example, the first byte thereof, namely, the most significant bit (MSB) 66 is allocated to the bit for stopping count (SCB) described above.

Figure 17:
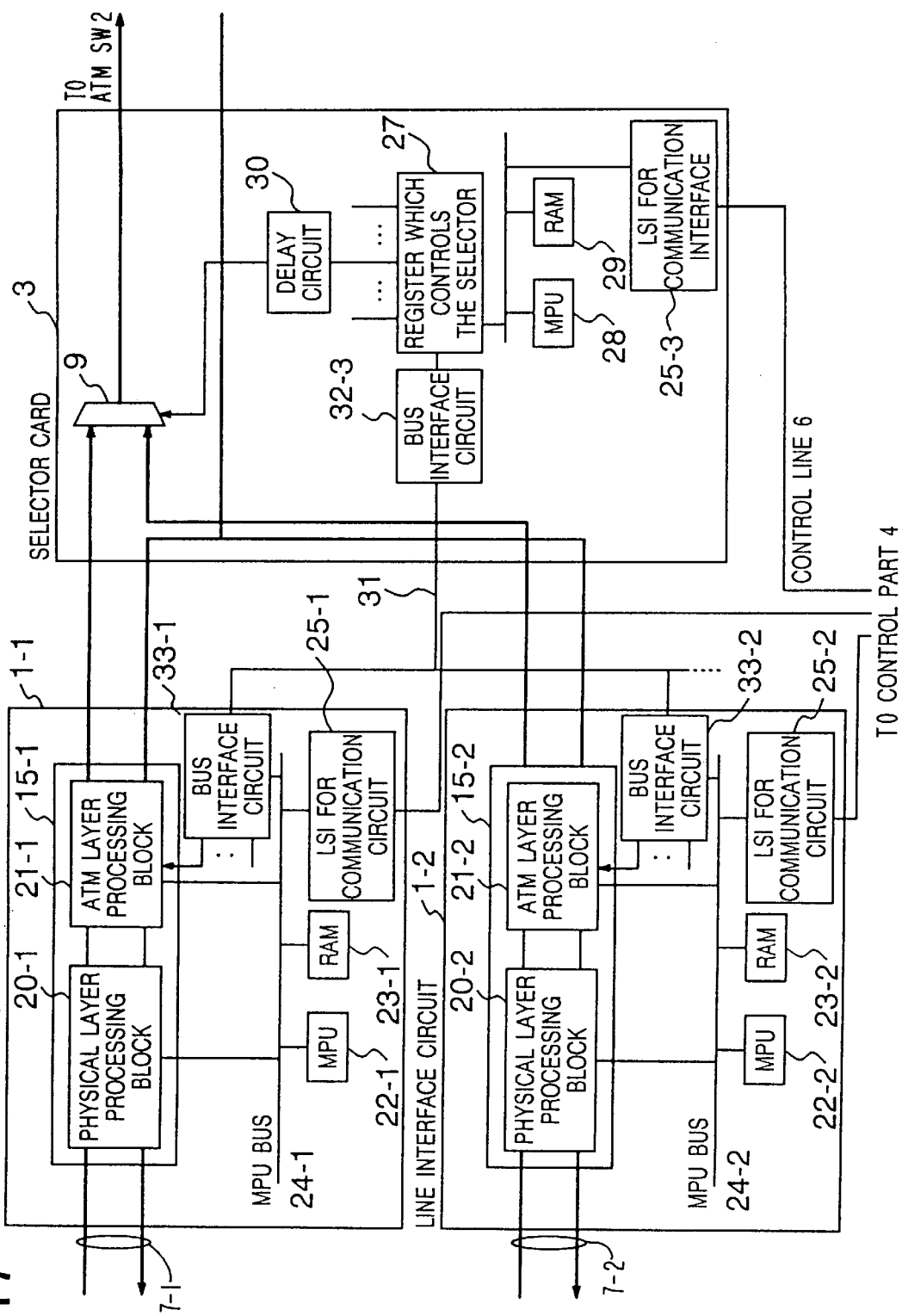
FIG. 17 is a diagram showing another embodiment of the line interface and selector cards of the ATM layer according to the present invention.

FIG. 17 shows another embodiment of the line interface and selector cards of the ATM handler according to the present invention.

In this embodiment, on the line interface cards 1-1 and 1-2 respectively for working and protection paths, there are respectively provided bus interface circuits 33-1 and 33-2 to distribute a system switchover signal to the line interface circuits 15-1 and 15-2 respectively related thereto. Disposed on the selector card 3 is a bus interface circuit 32 linked with the MPU 28. Connecting these bus interface circuits 32 and 33 to each other via a bus for connecting cards 31, it is possible to broadcast system switchover data outputted from the side of selector card 3 onto the bus 31 to the interface cards 1-1 and 1-2.

On receiving a system switchover order from the control part 4 via the communication interface 25-3, the MPU 28 on the selector card side sets a status value to the selector control register 27 according to the system switch order and transmits the system switchover data via the bus interface 32 to the bus 31. When the system switchover signal is received, the bus interface circuits 33-1 and 33-2 respectively of the interface cards 1-1 and 1-2 respectively generate system switchover signals mutually different from each other according to the system switchover data and sends the signals to the ATM layer processing blocks 21-1 and 21-2 of the interface circuits 15- and 15-2, respectively. Incidentally, the structure of ATM layer processing blocks 21 may be almost the same as those shown in FIGS. 1 and 13.

In the configuration in which the system switchover is instructed via the bus for connecting cards to the line interface cards as shown in this embodiment, a delay period of time (to be referred to as a bus transfer time herebelow) Tb may possible take place from when the status value is set to the selector control register 27 to when the system switchover data arrives at the side of line interface cards, causing a delay in the change-over of the counting operation.

The influence of the bus transfer time Tb can be avoided, for example, as follows. A delay circuit 30 having delay time Tb is provided between the selector control register 27 and the selector 9 as shown in the diagram such that the selector 9 is operated when a predetermined period lapses after the system switchover signal is generated from the selector control register 27 on the side of selector card 3, thereby synchronizing the switchover of the selector 9 with the arrival of the system switchover data at the line interface circuits 15 on the side of the line interface cards 1. In place of the provision of the delay circuit 30, there may be employed an operation in which the MPU 28 softwarewise controls the time. That is, the system switchover data is first sent onto the bus 31 and then the status value is set to the register 27 after lapse of a period of time corresponding to delay time Tb.

Figure 18:
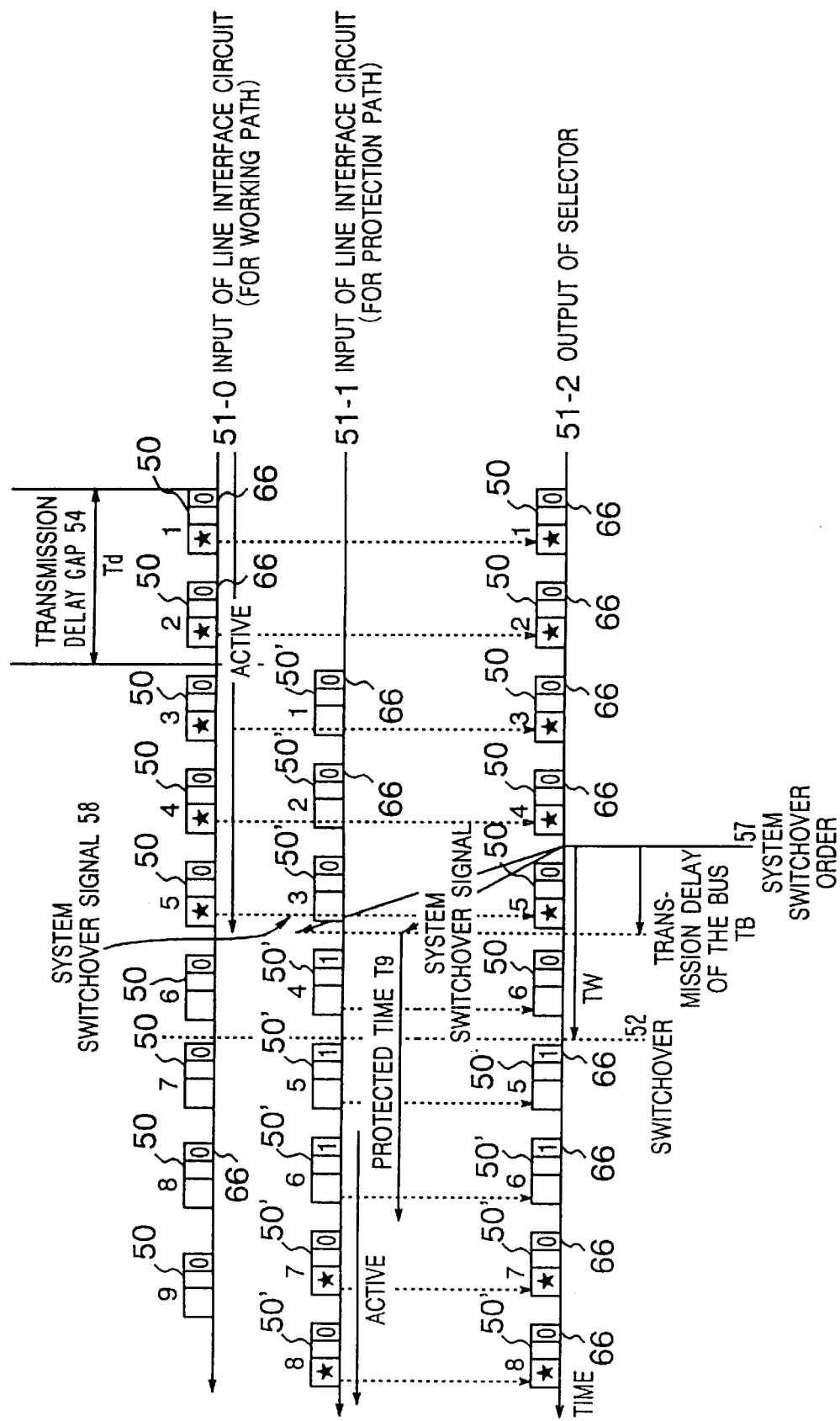
FIG. 18 is a diagram for explaining a relationship between the operation to count cells and the system switchover on the input side of the ATM handler of FIG. 17.

In this connection, when it is difficult to establish a matching state between delay time Tw and bus transfer time Tb by the delay circuit 30 or the MPU 28, the relationship between the switchover of the operation to count user cells and outputs from the selector can be controlled as shown in FIG. 18, for example, by setting delay time Tw to be larger than bus transfer time Tb.

At a point of time (58) when bus transfer time Tb lapses after the MPU 28 sets, in response to the system switchover order from the control part 4 received at time 57, a status value to the selector control register 27 according to the system switchover order, the system switchover signal reaches the respective line interface circuits 15-1 and 15-2. On the side of line interface card 1, the line interface circuit 15-1 for working path which has been in the active status up to this point stops the counting operation and then the line interface circuit 15-2 for protection path starts the operation to add the bit for stopping counting. When protection time Tg lapses, the interface circuit 15-1 for working path terminates the operation of adding the bit for stopping counting and initiates the cell counting operation.

On the side of selector card 3, the selector 9 conducts the system switchover according to the delay circuit 30 when delay time Tw lapses after the reception of the system switchover order. Therefore, the input cell 50 (sixth cell) for which the interface circuit 15-1 for working path 0 does not conduct the counting operation passes the selector 9. On this occasion, the count value on the input side is less than the actual number of user cells and hence there does not occur an event in which the cell are missing in the count operation, thereby preventing any disadvantage for the user.

In the construction employing the bus for connecting cards 31, the respective MPUs 22 on the line interface cards 1 can communicate information such as a report of defect via the bus 31 with the MPU 28 on the selector card 3 in a timesharing manner. In consequence, when a defect of a transmission path is detected on the side of line interface cards 1, the MPU 22 can notify the defect to the MPU 28 on the side of selector card 3. Resultantly, the system may be switched over in an autonomous manner without receiving any order from the control part 4.

As above, the system in which the bit for stopping counting is assigned to any input cell having passed the line interface circuit during the protection period so as to suppress the operation of counting user cells in the line interface circuit on the output side can also be applied to operations other than the system switchover in the line interface circuit. For example, assume that the line interface circuit on the input side measures the performance of the transmission path. When the performance becomes below a predetermined value, an indication tag of degradation of performance is added to the internal header of each input cell. In the interface circuit on the output side, the cell having the indication tag of degradation of performance is not subjected to the count operation for the accounting purpose. Moreover, for input cells from lines of special services such as the welfare and police services or for input cells related to particular connections identified in the signalling stage, there may be used a tag denoting a flag for stopping counting. Namely, in the line interface circuit, the tag is added to each input cell such that the cell is not counted for the accounting purpose on the output side.

As can be appreciated from the description above, according to the configuration of the present invention, there can be rationally acquired information of performance at transmission system switchover in the ATM handler including line interfaces in the redundant architecture. Additionally, even when the phase difference occurs between the cells on the duplicated transmission paths, the acquisition of information of performance represented by the count of user cells can be continuously achieved before and after the system switchover.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An ATM handler accommodating redundant transmission paths comprising:

switch means including a plurality of input ports and a plurality of output ports for distributing an input cell from each of the input ports to either one of the output ports determined according to header information of the input cell;

at least one pair of line interface circuits connected to the redundant transmission paths;

selector means connected between each of the line interface circuits and the input ports of the switch means;

a controller for controlling an overall operation of the ATM handler;

register means having a status value to be altered according to a system switchover order from the controller, wherein a switchover operation of the line interface circuit to be coupled with one of the input ports of the switch means by the selector means and a switchover operation of an operation to count cells in the line interface circuits are accomplished in response to a system switchover signal output from the register means;

a first microprocessor including a communication interface connected to one of the line interface circuits;

a second microprocessor including a communication interface connected to other one of the line interface circuits; and a third microprocessor including a communication interface connected the register means, wherein the controller communicates via a control line with each of the microprocessors according to a predetermined communication protocol;

wherein the third microprocessor changes the status value of the register means in response to the system switchover order;

a system switchover signal output from the register means is input via a wire independent of the control line to the selector means and the line interface circuits;

wherein each of the line interface circuits including first cell processing means having a predetermined count function for input cells from the transmission path and second cell processing means having a predetermined count function for output cells to the transmission path;

wherein the selector means selects one of two steams of input cells having passed each of the first cell processing means of the pair of line interface circuits according to the system switchover signal and supplies the selected stream of input cells to either one of the input ports;

wherein the selector means supplies a stream of output cells from either one of the output ports of the switch means to each of the second cell processing means in a concurrent manner;

wherein each of the first cell processing means includes a first count processing unit for achieving a predetermined header conversion for each input cell from the transmission path and a first header processing unit for conducting a predetermined header conversion for each input cell;

wherein each of the second cell processing means includes a first header processing unit for achieving a predetermined header conversion for each output cell to the transmission path and a second count processing unit for conducting a predetermined counting operation for each output cell; and wherein the first and second microprocessors periodically collect count values of cells respectively from the first and second count processing units in the line interface circuits respectively corresponding thereto and transmit, in response to a request from the controller, results of the collection to the controller.

2. An ATM handler accommodating redundant transmission paths comprising:

switch means including a plurality of input ports and a plurality of output ports for distributing an input cell from each of the input ports to either one of the output ports determined according to header information of the input cell;

at least one pair of line interface circuits connected to the redundant transmission paths;

selector means connected between each of the line interface circuits and the input ports of the switch means;

a controller for controlling an overall operation of the ATM handler;

register means having a status value to be altered according to a system switchover order from the controller, wherein a switchover operation of the line interface circuit to be coupled with one of the input ports of the switch means by the selector means and a switchover operation of an operation to count cells in the line interface circuits are accomplished in response to a system switchover signal output from the register means;

a first microprocessor including a communication interface connected to one of the line interface circuits;

a second microprocessor including a communication interface connected to other one of the line interface circuits;

a third microprocessor including a communication interface connected the register means, wherein the controller communicates via a control line with each of the microprocessors according to a predetermined communication protocol;

wherein the third microprocessor changes the status value of the register means in response to the system switchover order;

wherein a system switchover signal output from the register means is inputted to the selector means and is input via a path independent of the control line to each of the line interface circuits according to a predetermined communication protocol;

wherein a system switchover signal output from the register means is input to the selector means via delay means having a predetermined delay;

wherein each of the line interface circuits includes first cell processing means having a predetermined count function for input cells from the transmission path and second cell processing means having a predetermined count function for output cells to the transmission paths;

wherein the selector means selects one of two streams of input cells having passed each of the first cell processing means of the pair of line interface circuits according to the system switchover signal and supplies the selected stream of input cells to either one of the input ports;

wherein the selector means supplies a stream of output cells from either one of the output ports of the switch means to each of the second cell processing means in a concurrent manner;

wherein each of the first cell processing means includes a first count processing unit for achieving a predetermined header conversion for each input cell front the transmission path and a first header processing unit for conducting a predetermined header conversion for each input cell;

wherein each of the second cell processing means includes a first header processing unit for achieving a predetermined header conversion for each output cell to the transmission path and a second count processing unit for conducting a predetermined counting operation for each output cell; and wherein the first and second microprocessors periodically collect count values of cells respectively from the first and second count processing units in the line interface circuits respectively corresponding thereto and transmit, in response to a request from the controller, results of the collection to the controller.

3. An ATM handler accommodating redundant transmission paths each including two incoming/outgoing lines in which one of the incoming/outgoing lines is used as an active system and the other is adopted as a standby system according to a system switchover order from a controller, comprising:

switch means including a plurality of input ports and a plurality of output ports for distributing an input cell from each of the input ports to either one of the output ports determined according to header information of the input cell;

a plurality of pairs of line interface circuits connected to the respective redundant transmission paths;

a plurality of selectors connected between each of the pairs of line interface circuits and the switch means for achieving a system switchover;

a plurality of pairs of line interface cards each including the line interface circuit, a communication interface for communicating with the controller, and a microprocessor connected to the line interface circuit and the communication interface; and a selector card including the plural selectors, register means for outputting a plurality of system switchover signals corresponding to the respective selectors, a communication interface for communicating with the controller, and a microprocessor connected to the register means and the communication interface;

wherein the microprocessor of each of the line interface cards communicates via the communication interface of the line interface card with the controller according to a predetermined communication protocol and conducts, in response to a control order received from the controller, a delivery operation of control information to each of the line interface circuits of the line interface card and a transmission operation of status information collected from each of the line interface circuits to the controller;

wherein the microprocessor of the selector card receives a system switchover order from the controller via the communication interface of the selector card and changes a setting value of the register means in response to the system switchover order; and wherein a switchover of the line interface circuit to be coupled with an input port of the switch means by the selector and a switchover of a cell counting operation in the pair of line interface circuits as the switchover objects are accomplished according to a system switchover signal output from the register means;

wherein the system switchover signal output from the register means is distributed to the pair of line interface circuits of each of the line interface cards via individual wires for each pair of line interface circuits;

wherein each of the line interface circuits includes first cell processing means having a predetermined count function for input cells from the transmission path and second cell processing means having a predetermined count function for output cells to be sent to the transmission path;

wherein the selector means selects one of two streams of input cells having passed each of the first cell processing means of the pair of line interface circuits according to the system switchover signal and supplies the selected stream of input cells to either one of the input ports;

wherein the selector means supplies a stream of output cells from either one of the output ports of the switch means to each of the second cell processing means in a concurrent manner;

wherein each of the first cell processing means includes a first count processing unit for achieving a predetermined header conversion for each input cell from the transmission path and a first header processing unit for conducting a predetermined header conversion for each input cell;

wherein each of the second cell processing means includes a first header processing unit for achieving a predetermined header conversion for each output cell to the transmission path and a second count processing unit for conducting a predetermined counting operation for each output cell; and wherein the microprocessor of each of the line interface cards periodically collects count values of cells respectively from the first and second count processing units in the line interface circuits of the line interface card and transmits, in response to a request from the controller, results of the collection to the controller.

4. An ATM handler accommodating redundant transmission paths each including two incoming/outgoing lines in which one of the incoming/outgoing lines is used as an active system and the other is adopted as a standby system in response to a system switchover order from a controller, comprising:

switch means including a plurality of input ports and a plurality of output ports for distributing an input cell from each of the input ports to either one of the output ports determined according to header information of the input cell;

a plurality of pairs of line interface circuits connected to the respective redundant transmission paths;

a plurality of selectors connected between each of the pairs of line interface circuits and the switch means for conducting a system switch;

a plurality of pairs of line interface cards each including the line interface circuit, a communication interface for communicating with the controller, a microprocessor connected to the line interface circuit and the communication interface, and a bus interface for distributing a system switchover signal to the line interface circuit;

a selector card including the plural selectors, register means for outputting a plurality of system switchover signals corresponding to the respective selectors, a communication interface for communicating with the controller, a microprocessor connected to the register means and the communication interface, and a bus interface connected to the microprocessor;

an internal bus for connecting the bus interface of each of the line interface cards to the bus interface of the selector card; and a control line for connecting the communication interface of each of the line interface cards and the communication interface of the selector card to the controller, wherein the microprocessor of each of the line interface cards communicates via the communication interface of the line interface card with the controller according to a predetermined communication protocol and conducts, in response to a control order received from the controller, a delivery operation of control information to each of the line interface circuits of the line interface card and a transmission operation of status information collected from each of the line interface circuits to the controller;

wherein the microprocessor of the selector card receives a system switchover order from the controller via the communication interface of the selector card and sets system switchover data to the register means to change the system switchover signal, and transmits the system switchover data via the bus interface to the internal bus in response to the system switchover order;

wherein the selector card includes means for adjusting a time lag between a switchover of the line interface circuit to be coupled with an input port of the switch means by the selector and a switchover of a cell counting operation by the pair of line interface circuits in response to the system switchover signal distributed from the bus interface of the line interface card;

wherein each of the line interface circuits includes first cell processing means having a predetermined count function for input cells from the transmission path and second cell processing means having a predetermined count function for output cells to be sent to the transmission path;

wherein the selector means selects one of two streams of input cells having passed each of the first cell processing means of the pair of line interface circuits according to the system switchover signal and supplies the selected stream of input cells to either one of the input ports;

wherein the selectors means supplies a stream of output cells from either one of the output ports of the switch means to each of the second cell processing means in a concurrent manner;

wherein each of the first cell processing means includes a first count processing unit for achieving a predetermined header conversion for each input cell from the transmission path and a first header processing unit for conducting a predetermined header conversion for each input cell;

wherein each of the second cell processing means includes a first header processing unit for achieving a predetermined header conversion for each output cell to the transmission path and a second count processing unit for conducting a predetermined counting operation for each output cell; and wherein the microprocessor of each of the line interface cards periodically collects count values of cells respectively from the first and second count processing units in the line interface circuits of the line interface card and transmits, in response to a request from the controller, results of the collection to the controller.

* * * * *